United States Patent [19]

Keller et al.

[11] Patent Number: 5,691,043

[45] Date of Patent: Nov. 25, 1997

[54] UNIAXIALLY SHRINKABLE BIAXIALLY ORIENTED POLYPROPYLENE FILM AND ITS METHOD OF PREPARATION

[75] Inventors: Lajos E. Keller; Marie-France Nothnagle, both of Fairport, N.Y.

[73] Assignee: Mobil Oil Corporation, Fairfax, Va.

[21] Appl. No.: 427,785

[22] Filed: Apr. 25, 1995

Related U.S. Application Data

[63] Continuation-in-part of Ser. No. 276,124, Jul. 15, 1994, abandoned.

[51] Int. Cl.[6] .................. B32B 27/08; B32B 27/32; B32B 5/16
[52] U.S. Cl. .................. 428/212; 428/34.9; 428/317.9; 428/349.9; 428/323; 428/327; 428/328; 428/451; 428/516; 428/910
[58] Field of Search .................. 428/34.9, 516, 428/520, 910, 483, 212, 327, 328, 447, 451, 220, 317.9, 318.6, 319.9, 323; 264/291, 211.12

[56] References Cited

U.S. PATENT DOCUMENTS

| | | | |
|---|---|---|---|
| 4,188,350 | 2/1980 | Vicik et al. | 428/516 |
| 4,194,039 | 3/1980 | Mueller | 428/516 |
| 4,632,869 | 12/1986 | Park et al. | 428/910 |
| 5,091,236 | 2/1992 | Keller et al. | 428/213 |
| 5,091,237 | 2/1992 | Schloegl et al. | 428/215 |
| 5,252,384 | 10/1993 | Bothe et al. | 428/516 |
| 5,254,394 | 10/1993 | Bothe et al. | 428/516 |
| 5,292,561 | 3/1994 | Peiffer et al. | 428/35.1 |
| 5,620,803 | 4/1997 | Oyama et al. | 428/516 |

*Primary Examiner*—Rena Dye
*Attorney, Agent, or Firm*—Dennis P. Santini; Lori F. Cuomo

[57] ABSTRACT

A uniaxially heat-shrinkable, biaxially oriented, multilayer film having a polypropylene-containing core layer comprising at least 70 wt % of said multilayer film and at least one polyolefin-containing skin layer adjacent said core layer is prepared by biaxially orienting a coextrudate and thereafter orienting said coextrudate by stretching 10 to 40% in the machine direction. The core layer contains isotactic polypropylene and a modifier which reduces the crystallinity of the polypropylene by increasing chain imperfections or reducing isotacticity of the polypropylene-containing core. Such modifiers can be selected from the group consisting of atactic polypropylene, syndiotactic polypropylene, ethylene-propylene copolymer, propylene-butylene copolymer, ethylene-propylene-butylene terpolymer, and linear low density polyethylene. The skin layer can be selected from the group consisting of polypropylene, ethylene-propylene copolymer, polyethylene, and ethylene-propylene-butylene terpolymer.

34 Claims, 13 Drawing Sheets

UNIAXIALLY SHRINKABLE BIAXIALLY ORIENTED POLYPROPYLENE FILM AND ITS METHOD OF PREPARATION

RELATED APPLICATIONS

This case is a continuation in part of U.S. application Ser. No. 08/276,124, filed Jul. 15, 1994, now abandoned, the entire contents of which are incorporated herein by reference.

BACKGROUND OF THE INVENTION

The present invention relates to the field of polymer films and, more particularly to a uniaxially heat shrinkable biaxially oriented polypropylene film.

As noted in U.S. Pat. No. 4,194,039, polyolefins can be used to prepare shrink films for wrapping purposes. Other suitable synthetic resins include various ionomers, polyvinyl chlorides, polyesters, polystyrenes and polyvinylidene chlorides.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. The resulting shrinkage of the film results in an aesthetically pleasing transparent wrapping which conforms to the contour of the product while providing the usual functions required of packaging materials such as protection of the product from loss of components, pilferage, or damage due to handling and shipment. Typical items wrapped in polyolefin shrink films are toys, games, sporting goods, stationery, greeting cards, hardware and household products, office supplies and forms, foods, phonograph records, and industrial parts.

The manufacture of shrink films requires relatively sophisticated equipment including extrusion lines with "racking" capability, irradiation units when cross-linking is desired, tenter frames, mechanical centerfolders, and slitters. "Racking" or "tenter framing" are conventional orientation processes which cause the film to be stretched in the cross or transverse direction and in the longitudinal or machine direction. The films are usually heated to their orientation temperature range which varies with different polymers but is usually above room temperature and below the polymer's melting temperature. After being stretched, the film is rapidly cooled to quench it thus freezing the molecules of film in their oriented state. Upon heating, the orientation stresses are relaxed and the film will begin to shrink back to its original, unoriented dimension.

Certain applications, e.g., labelling, covering, or packaging of materials such as boxes, plates, vessels, bottles, tubes, cylindrical material, e.g., pipes, and rods, etc. are especially susceptible to covering with heat shrinkable films. However, in certain situations it is desirable to effect shrinkage along a single axis without substantial shrinkage in the cross-direction. For example, in the process of labelling bottles by shrinking a tube of heat shrinkable material, if the film shrinks along its length, the label may not be placed in the right position but rather placed at above the desired position upon shrinkage. Moreover, printing and other conversion processes of such label surfaces require heat stability in substantially one direction to meet machinability requirements. Uniaxially shrinkable materials can also be used in preparing tightly wrapped containers by lap heat sealing uniaxially shrinkable film resulting in shrink down of the wrapping.

In order to obtain uniaxially shrinkable materials it is possible to employ uniaxially oriented materials, i.e., materials which are oriented in only one direction. However, uniaxially oriented film can lack the requisite strength and toughness necessary for use in such applications. Inasmuch as biaxially oriented films exhibit desirable strength and tear resistance in both directions of orientation, it would be desirable to obtain a uniaxially heat shrinkable film which is biaxially oriented and thus substantially stable in the cross-direction.

For more detailed disclosures of heat shrinkable films, reference may be had to aforesaid U.S. Pat. No. 4,194,039, as well as U.S. Pat. Nos. 3,808,304; 4,188,350; 4,377,616; 4,390,385; 4,448,792; 4,582,752; and 4,963,418, all of which are incorporated herein by reference.

U.S. Pat. No. 5,292,561 (corresponding to EPA 0498249) discloses a process for producing polyolefin shrink films having high unidirectional shrinkage (at least 10% longitudinal shrinkage and less than 2% transverse shrinkage at 100° C.) under conditions comprising an MD reorientation mechanical MD/TD draw ratio between 1.01 and 7.5. The base layer of the films contain propylene polymer and optionally, hydrogenated hydrocarbon resin.

EPA 0204843 discloses a low temperature shrinkable film comprising linear low-density polyethylene resin having film shrink properties of 30% or more MD and 5% or less TD at 90° C., which is prepared by drawing the film at a high draw ratio (3 to 6) in the machine direction.

EPA 0321964 describes a process for extruding a shrink film from a linear low density copolymer of ethylene and at least one alpha-olefin having 3 to 6 carbon atoms to provide a material which exhibits shrinkage at 135° C. of at least 30% MD and at least 10% TD.

EPA 0477742 discloses a transparent polypropylene shrink film which exhibits shrinkage at 100° C. of at least 10% MD and less than 2% TD. The polypropylene comprises a 15% or less, preferably 2 to 6% n-heptane soluble component.

EPA 0299750 discloses a mono- or biaxially stretched film having a heat shrinkage of 20% or more in one of the longitudinal and transverse directions and 60% or more in the other direction. The film comprises principally a linear polyethylene and optionally, a branched low-density polyethylene.

EPA 0595270 discloses a heat sealable laminate having high unidirectional shrinkage produced from biaxially oriented polymeric film such as biaxially oriented polypropylene or blends of polypropylene and copolymers of propylene with minor amounts of ethylene or an alpha-olefin. Uniaxial shrinkability is achieved by balancing MD reorientation process variables such as temperature, draw ratio, line speed, and oriented polymer film properties. Heat sealability is imparted by the presence of a heat seal layer.

It is an object of the present invention to impart uniaxial heat shrinking properties to a biaxially oriented multilayer film comprising a polypropylene core.

It is a further object of the present invention to provide a biaxially oriented multilayer film comprising a polypropylene core which is uniaxially heat shrinkable.

It is a further object of the present invention to provide a biaxially oriented polypropylene core which contains isotactic polypropylene and a modifier which reduces the crystallinity of the polypropylene by increasing chain imperfections or reducing isotacticity of the polypropylene-containing core.

SUMMARY OF THE INVENTION

The present invention relates to a uniaxially heat-shrinkable, biaxially oriented, multilayer film having a polypropylene-containing core layer and at least one polyolefin-containing skin layer adjacent said core layer. The core layer contains isotactic polypropylene and a modifier which reduces the crystallization or crystallinity of the polypropylene by increasing chain imperfections or reducing isotacticity of the polypropylene-containing core.

The present invention further relates to a uniaxially shrinkable multilayer biaxially oriented film having a polypropylene-containing base layer and at least one skin layer adjacent said base layer, which film is primarily biaxially oriented by orienting 3 to 6 times in a first direction at a temperature of 110° to 130° C., orienting 5 to 10 times in a second direction substantially normal to said first direction at a temperature of 130° to 160° C., thereafter cooling said film, say, to a temperature no greater than 100° C., and thereafter secondarily orienting the film in the first direction 1.1 to 1.4 times at 100° to 125° C.

The present invention also relates to a method for preparing uniaxially heat-shrinkable, biaxially oriented, multilayer film having a polypropylene-containing core layer comprising at least 70 wt % of said multilayer film and at least one polyolefin-containing skin layer adjacent said core layer. The method comprises 1) coextruding said core layer and said skin layer through a flat die to provide a coextrudate,
2) biaxially orienting said coextrudate by orienting 3 to 6 times in a first direction at a temperature of 115° to 130° C., and orienting 5 to 10 times in a second direction substantially normal to said first direction at a temperature of 130° to 160° C.,
3) cooling said biaxially oriented coextrudate to a temperature no greater than 100° C. and
4) reorienting said cooled biaxially oriented coextrudate in the first direction by 10 to 40% at 100° to 125° C.

In yet another aspect, the present invention relates to heat-shrinkable polyolefin films which have a secondary machine direction (MD) stretch of up to 40%, with recovery upon the application of heat (i.e., machine direction shrinkage) of at least 25% at 135° C., with 0±1% dimensional change in the transverse direction (TD). The present invention further relates to the preparation of precursors of heat-shrinkable films which precursors are biaxially oriented polyolefin films which are capable of being secondarily oriented by stretching up to 40% in the machine direction without tearing.

DETAILED DESCRIPTION OF THE INVENTION

Core

Figure 1:
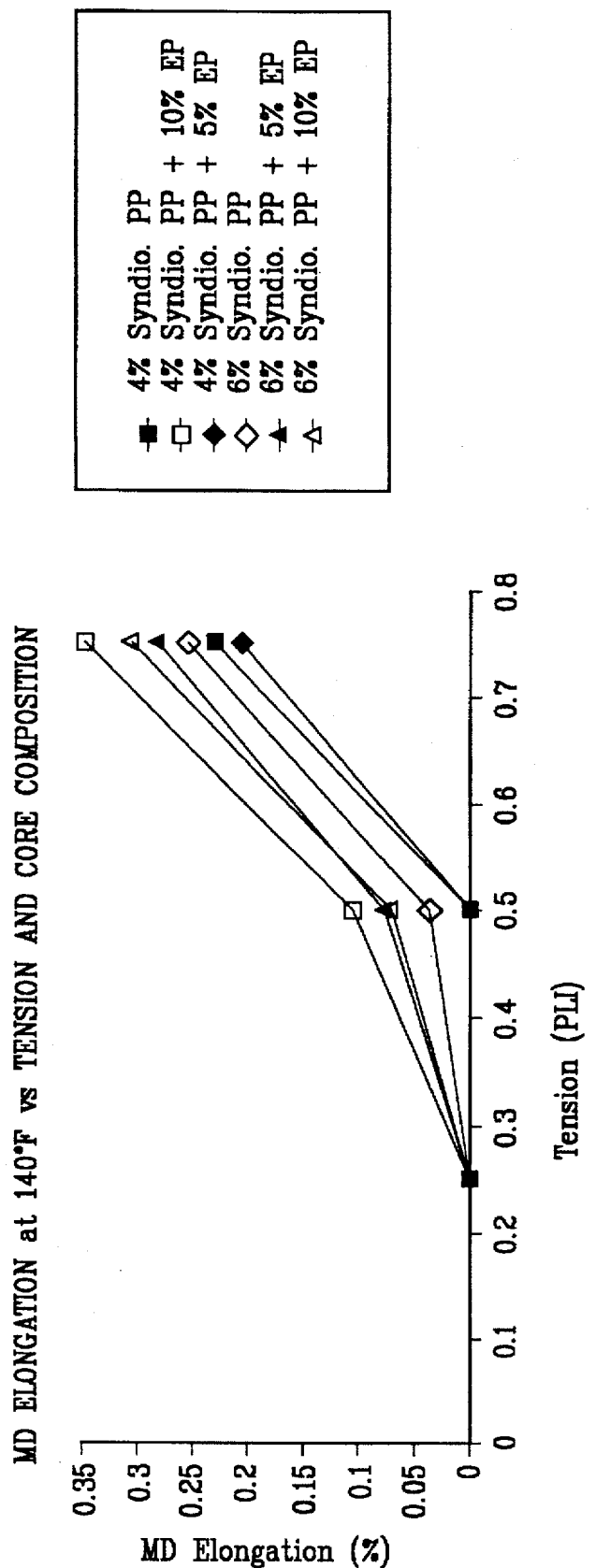
FIG. 1 depicts MD elongation (%) over the range of 44.7 g per linear cm to 134 g per linear cm (0.25 pli (pounds per linear inch) to 0.75 pli) for Examples 17 and 33 to 37.

The composition of the polypropylene-containing core layer of the multilayer film of the present invention must provide sufficient operability so that the film after biaxial orientation exhibits crystallinity which is low enough to permit the secondary orientation of the film, which imparts the uniaxial shrinkability to the film, without tearing. The core layer material can be a single polypropylene homopolymer material which is sufficiently atactic and which has a specific melting point, as determined by the DSC (Differential Scanning Calorimetery) method, e.g., at a heating rate of 2° C./minute. Alternately, the core layer material can comprise a blend of a more isotactic polypropylene with modifiers which are polyolefin materials which are less crystallizable due to a higher degree of chain imperfections or lower isotacticity. Suitable DSC melting points for the core layer, blended or not, can be less than 160° C., e.g., less than 150° C., or even less than 140° C.

Modifiers suited to use in the present invention include polyolefins other than isotactic polypropylene. The modifier can be selected from the group consisting of atactic polypropylene, syndiotactic polypropylene, ethylene-propylene copolymer, propylene-butylene copolymer, ethylene-propylene-butylene terpolymer, polybutylene, and linear low density polyethylene.

Several ways have been found to provide a polypropylene core having a higher degree of chain imperfections and the desired post primary orientation crystallinity. The desired crystallinity avoids tearing of the biaxially oriented film during secondary orientation at stretch levels of greater than 30% or greater than 35%, e.g., up to 40% or even up to 45%. Isotactic polypropylene, i.e., polypropylene having less than 5% atacticity, say less than about 3% atacticity, can be combined with a modifier, e.g., atactic polypropylene, to provide a suitable core layer. Atactic content can be measured by a polymer's insolubility in boiling n-hexane with chain imperfections being observed via NMR tests.

In one aspect of the present invention, the modifier, e.g., atactic polypropylene, is added to the core in amounts sufficient to provide a core layer having an overall atacticity greater than 2%, preferably greater than 4%, greater than 5% or greater than 6%, say, e.g., 6 to 15%. For present purposes, atactic polypropylene has an atacticity of at least 10%, preferably at least 15%, e.g., 15 to 20% or 15 to 25%. Atactic polypropylene can be used alone as the core or added to isotactic polypropylene in amounts such that the resulting mixture comprises 10 to 99 wt % atactic polypropylene, e.g., 10 to 30 wt %, preferably 15 to 20 wt %. atactic polypropylene. Blends of 15 wt % atactic polypropylene (15% atacticity) and 85 wt % isotactic polypropylene (of 4 to 5% atacticity) are especially preferred.

A suitable atactic polypropylene for use in the present invention has an atacticity of 15% which can be added to isotactic polypropylene to provide a core mixture containing 15 wt % atactic polypropylene thereby increasing overall core atacticity by 2.25 wt %.

Commercially available isotactic propylene suited to use in the present invention includes Fina 3371 from Fina Oil and Chemical Co., Chemical Div., Dallas, Tex. Atactic polypropylenes which are commercially available include L1300 from Novolen of BASF Corp., Parsippany, N.J.

In another embodiment, the present invention employs a core layer which comprises polypropylene as described above, preferably isotactic polypropylene, mixed with polybutylene modifier to provide a core layer containing 2 to 15 wt % polybutylene, preferably 5 to 10 wt % polybutylene. Suitable polypropylene/polybutylene-1 homogeneous blends are described in U.S. Pat. 3,808,304, the disclosure of which is incorporated by reference herein. This disclosure teaches blends containing from 30 to 90 weight parts of polypropylene, and correspondingly, from 70 to 10 weight parts of polybutene-1. Suitable polybutylenes include PB 8430, available from Shell Chemical Co. of Houston, Tex.

In yet another aspect of the invention, the core layer comprises polypropylene as described above, preferably isotactic polypropylene, mixed with ethylene-propylene copolymer modifier, e.g., 2 to 10 wt % ethylene-propylene copolymer, preferably 3 to 10 wt % E-P copolymer. Suitable E-P copolymer can contain from 2 to 7 weight percent ethylene, the balance being propylene. The copolymers can have a melt index at 230° C. generally ranging from 2 to 15, preferably from 3 to 8. The crystalline melting point is usually from about 125° C. to about 150° C., and the number average molecular weight is about 25,000–100,000. The density is preferably from 0.89 to 0.92 g/cm$^3$. Suitable E-P copolymers include EP 8573, available from Fina Oil and Chemical Co., Chemical Div., Dallas, Tex.

In still another aspect of the invention, the core layer is a blend of polypropylene as described above, preferably isotactic polypropylene, mixed with 0 to 10 wt % ethylene-propylene copolymer, said copolymer preferably being 50 to 100 wt % E-P copolymer which contains from 0.5 to 1 wt % ethylene, the balance being propylene. These fractional copolymers are commercially available as ready-mix resin containing 0.6 wt % ethylene (4173 from Fina).

In another aspect of the invention, the core layer is a blend of polypropylene as described above, preferably isotactic polypropylene, mixed with propylene-butylene copolymer. The core layer can comprise 5 to 20 wt % propylene-butylene copolymer, preferably 10 to 20 wt %. Suitable propylene-butylene copolymers include Cefor SRD4-105, and Cefor SRD4-104 available from Shell Chemical Co. The core layer can comprise 5 to 20 wt % of said propylene-butylene copolymer as modifier.

In yet another aspect of the invention, the core layer is a blend of polypropylene as described above, preferably isotactic polypropylene, mixed with linear low density polyethylene (LLDPE). These polymers typically have a melt index of 1 to 10. The linear low density polyethylenes should have a density in the range 0.88–0.94 g/cc, preferably, 0.89–0.92 g/cc. The linear low density polyethylenes may be derived from ethylene together with other higher comonomers such as butene-1, hexene-1 or octene-1. The core layer can comprise 2 to 15 wt % LLDPE, preferably 5 to 10 wt % LLDPE. Commercially available LLDPEs include Exact 2009, Exact 2010, and Exact 3016 available from Exxon Chemical Co.

In a particularly preferred embodiment, the core layer is a blend of polypropylene as described above, preferably isotactic polypropylene, mixed with syndiotactic polypropylene and, optionally, ethylene-propylene copolymer. Syndiotactic polypropylene can be present in the core layer in amounts ranging from 2 to 10 wt %, say, 4 to 8 wt %, preferably 4 to 6 wt %, with 0 to 40 wt % ethylene-propylene copolymer, preferably 0 to 20 wt % E-P copolymer. Suitable E-P copolymers are described above. The presence of E-P copolymer improves MD tensile strength in the secondary orientation step. However, E-P copolymer content must be carefully determined inasmuch as the presence of E-P copolymer can cause undesirable film elongation even at lower temperatures, e.g., 60° C. (140° F.) drying temperatures, which elongation can cause registration problems during converting processes such as printing.

The syndiotactic polypropylene used as a modifier in the present invention can possess an isotacticity of less than 15%, in particular less than 6%. The mean length of sequence $\sim n_r$ of the syndiotactic sequences is preferably greater than about 20, more preferably greater than about 25. The molar mass distribution corresponds to the relation $$M_w = k \times M_n,$$

where $M_w$ stands for the weight average of the molar mass distribution, $M_n$ stands for the number average of the molar mass distribution and k is a factor which is between about 1 and about 5, preferably between about 2 and about 3.

The weight average is preferably between about 60,000 and about 250,000, in particular between about 90,000 and about 160,000. The mean molar masses can be determined according to customary methods; of these, the method of gel permeation chromatography has proven to be particularly suitable.

Commercially available syndiotactic polypropylene resins suited to use in the present invention include EOD 9306 and EOD 9502 available from Fina.

In yet another aspect of the invention, the core layer is a blend of polypropylene as described above, preferably isotactic polypropylene, mixed with ethylene-propylene-butylene terpolymer as modifier. The core layer can comprise 5 to 20 wt % of the terpolymer. Suitable terpolymers include those containing 3 to 5 wt % ethylene and 3 to 6 wt % butylene. Such terpolymers are available from Chisso, under the tradename Chisso 7700 Series. Other suitable ethylene-propylene-butylene terpolymers include those containing 0.5 to 3 wt % ethylene, and 13 to 20 wt % butylene. Such terpolymers are available from Chisso, under the tradename Chisso 7800 Series.

Suitable core layers of the present invention can comprise recycled polypropylene (RPP), e.g., up to 25 wt % RPP, preferably up to 15 wt %. RPP.

The core layer of the present invention may also comprise a plurality of voids formed by cavitation about a solid cavitation agent. Polybutylene terephthalate, e.g., in amounts comprising 4 to 8 wt % of the core layer, well-dispersed as fine spherical particles, e.g., 0.2 to 2 microns in diameter, as described in U.S. Pat. Nos. 5,288,548, 5,267, 277 and U.S. Pat. No. 4,632,869, the contents of which are incorporated herein by reference, is a suitable cavitation agent. The spherical particles form microvoids on orientation, resulting in a white opaque product. Such a core layer can further comprise a supporting layer of polypropylene on one or both sides of the core with at least one of said layers containing 4 to 15 wt % $TiO_2$. Further description of such use of $TiO_2$-containing layers is found in U.S. Pat. No. 5,091,236, the contents of which are incorporated herein by reference. Incorporation of skin layers over the supporting layers serves to encapsulate the abrasive $TiO_2$ and provides a highly opaque, five layer structure. The multilayer film has improved functionality for printing, metallizing, adhesives, coatings, and heat sealability. Alternatively, clear five layer structures can be prepared by substituting a supporting layer of polypropylene on both sides of the core, which layer does not contain opacifying materials.

The opacity and low light transmission of the film may be enhanced by the addition to the core layer itself of from about 1% by weight and up to about 10% by weight of opacifying compounds, which are added to the melt mixture of the core layer before extrusion. Opacifying compounds which may be used include iron oxides, carbon black, graphite, aluminum, $TiO_2$, and talc.

A 30 micron polygage, clear film equivalent, white opaque film described above will have a density of 0.6 to 0.75 g/cc, an optical-cavitated thickness gauge of 36 to 45 microns and light transmission of 15 to 25% depending on percentage of PBT dispersed and the orientation conditions, including the extent of stretching as well as MD and TD orientation temperatures.

The aforementioned blends of propylene and other constituents noted above may be admixed by any suitable means to form a homogeneous blend, such as dry mixing, solution mixing, or mixing the two polymers together while in a molten state or combinations thereof.

Skin Layer

The skin layer of the present invention may be any of the coextrudable, biaxially orientable heat shrinkable film-forming resins known in the prior art. Such materials include those discussed above which are suited to use in the core layer, including isotactic polypropylene, atactic polypropylene, polypropylene blended with polybutylene, propylene-butylene copolymer, and ethylene-propylene copolymer, including fractional E-P copolymer. In addition, polyethylene or ethylene-propylene-butylene terpolymer may be employed as the skin layer.

Ethylene-propylene-butylene random terpolymers suited to use in the skin layers of the present invention include those containing 1–5 weight percent random ethylene, 10–25 weight percent random butylene. The amounts of the random ethylene and butylene components in these copolymers are typically in the range of 10 to 25 percent total (ethylene plus butylene). Typical terpolymers of this type include those with about 1–5 percent ethylene and 10–25 percent butylene.

These copolymers typically have a melt flow rate in the range of about 5 to 10 with a density of about 0.9 and a melting point in the range of about 115° to about 130° C.

In one aspect of the invention the skin layer is derived from a linear low density polyethylene (LLDPE). These polymers typically have a melt index of 1 to 10. The linear low density polyethylenes may have a density as high as 0.94, usually in the range 0.90–0.91, e.g., 0.92 or 0.91, with a melt index from about 1 to about 10. The linear low density polyethylenes may be derived from ethylene together with other higher comonomers such as butene-1, hexene-1 or octene-1.

Each skin layer adjacent to the core layer can range in thickness from 0.5 to 3 microns (0.02 to 0.12 mil), preferably 0.5 to 1.0 micron (0.02 to 0.04 mil), e.g., 0.5 to 0.75 micron (0.02 to 0.03 mil).

Prior to incorporation in the film, e.g., before extrusion, at least one of the skin layers can be compounded with an anti-blocking effective amount of an anti-blocking agent, e.g., silica, clays, talc, glass, and the like which are preferably provided in the form of approximately spheroidal particles. The major proportion of these particles, for example, anywhere from more than half to as high as 90 weight percent or more, will be of such a size that significant portion of their surface area, for example, from about 10 to 70 percent thereof, will extend beyond the exposed surface of the skin layer. In a preferred embodiment, the anti-blocking agent comprises non-meltable silicone resin, e.g., particulate cross-linked hydrocarbyl-substituted polysiloxanes. Particularly preferred particulate cross-linked hydrocarbyl-substituted polysiloxanes include the poly-monoalkylsiloxanes. Most particularly preferred are non-meltable polymonoalkylsiloxanes characterized as having a mean particle size of 0.5 to 20.0 microns and a three dimensional structure of siloxane linkages. Such materials are available from Toshiba Silicone Co., Ltd., worldwide, and in the United States from General Electric Co., and are marketed under the tradename Tospearl. Other commercial sources of similar suitable materials are also known to exist. Such materials are further described as non-meltable crosslinked organosiloxane resin powders in U.S. Pat. No. 4,769,418, incorporated herein by reference. Effective amounts of the particulate cross-linked hydrocarbyl-substituted polysiloxane anti-blocking agent can range from 100 to 5000 ppm, preferably 1000 to 3000 ppm, say, from 2500 to 3000 ppm, based on loading of the resin from which the upper layer (c) is prepared.

Reduced coefficient of friction and reduced antistatic characteristics at the surface of the skin layer or layers can be achieved in accordance with the disclosure set out in U.S. Pat. No. 5,264,277, incorporated herein by reference, which discloses the use of migratory slip agents and antistatic agents in multilayer films. Reduced COF may also be obtained by treating one or both skins with 2000 to 15000 ppm silicone oil.

If desired, the exposed surface of the skin layer or skin layers can be treated in a known and conventional manner, e.g., by corona discharge to improve its receptivity to printing inks, coatings, adhesive anchorage, and/or its suitability for such subsequent manufacturing operations as lamination.

It is preferred that all layers of the multilayer film structures of the present invention be coextruded, after which the film can be biaxially oriented (primary orientation) and thereafter secondarily oriented in the direction in which shrinkability is desired. Coextrusion can be carried out in a multilayer melt form through a flat die.

Primary Orientation

The multilayer coextrudate film can be primarily oriented biaxially. Biaxially oriented film can be stretched 3 to 6 times, preferably 4 to 5 times in a first direction, preferably the machine direction (MD), and 5 to 10 times, preferably 7 to 8 times in a second direction which is substantially normal to the first direction, preferably the transverse direction (TD). Biaxial orienting can be carried out using a conventional tenter or stenter machine at a drawing temperature of 100° to 140° C., e.g., 130° C. Generally, biaxial orientation temperatures differ for MD orientation (115° to 130° C., e.g., 120° C.) and TD orientation (130° to 160° C., e.g., 150° C.). Film thickness at this stage can range from 25 to 75 microns (1 to 3 mils), preferably 25 to 50 microns (1 to 2 mils). Cooling of the film to temperatures below 100° C. occurs prior to secondary orientation.

Secondary Orientation

The primarily oriented film is then reheated to 100° to 125° C., say 110° to 115° C., preferably by use of heated cylinders and stretched an additional 10 to 40%, preferably 25 to 30%, in the first direction of orientation, e.g., machine direction (MD). In order to minimize compressive stress which can adversely affect second direction heat stability, e.g., TD heat stability, it is desirable to maintain a minimal distance between the reheating roll(s) and the cooling/stretching roll(s) used in secondary orientation. Such distances can be less than 30 cm, e.g., 5 to 10 cm.

The resulting uniaxially shrinkable film after secondary orientation can range in thickness from 10 to 60 microns (0.4 to 2.4 mils), preferably 20 to 40 microns (0.8 to 1.6 mils).

Simultaneous Orientation

The films of the present invention can also be prepared by orienting on a line which utilizes linear motors to directly propel opposed pairs of tenter clips synchronously whereby primary orienting by simultaneous biaxial orienting is effected by accelerating along a diverging path directly opposed pairs of tenter clips holding the film. In other words, the film can be primarily oriented by synchronously accelerating along a diverging path, directly opposed pairs of tenter clips holding the film.

Secondary machine direction orientation on the same line can be effected along a parallel path subsequent to the diverging path by simultaneously accelerating the directly opposed pairs of tenter clips along some portion of the parallel path. In other words, the film is secondarily oriented by synchronously accelerating along a straight path, directly opposed pairs of tenter clips holding the film.

The film can be further stabilized by heat setting and annealing and subsequent cooling before leaving the tenter frame such that the resulting film will have good machine direction stability at temperatures less than 100° C. and shrinkage at 25% or more at 135° C. or greater in the machine direction and good TD direction stability at 135° C. or below, e.g., less than 5%.

The use of linear motors to directly propel tenter clips to effect simultaneous biaxial stretching is further disclosed in U.S. Pat. No. 4,853,602 to Hommes, et al., the contents of which are incorporated herein by reference in their entirety.

The resulting uniaxially shrinkable film after secondary orientation can range in thickness from 10 to 60 microns, (0.4 to 2.4 mils), preferably 20 to 40 microns (0.8 to 1.6 mils).

Dimensional Stability

The resulting uniaxially shrinkable film after secondary orientation exhibits at temperatures of 100° to 145° C., say, 135° C., greater than 15%, preferably greater than 18%, 20%, or even greater than 25% shrinkage in the direction of secondary orientation, e.g., machine direction. Shrinkage is determined by measuring the difference of sample length before and after placing the sample, unrestrained, in a 135° C. oven for 7 minutes.

Shrinkage in the direction of secondary orientation preferably occurs with minimal variation in the direction normal to said secondary orientation, e.g., transverse direction. Such variation or stability can be described in terms of the change in length of the multilayer film in the direction normal to the secondary orientation and can include both expansion and shrinkage as a percentage of the dimension prior to heat exposure. The present invention's films can exhibit ±5% stability, preferably ±3% stability, or even ±1% stability in the direction normal to that of secondary orientation. Stability of ±5% means that the dimension of the film normal to the direction of secondary orientation, after heating to 135° C. (275° F.) shrinks or expands no greater than 5% of the original dimension of the film at room temperature.

Elongation at Lower Temperatures

Another parameter of interest is the resistance to stretching or dimensional stability of the film after secondary orientation in the direction of secondary orientation (% elongation) under common processing conditions, e.g., print drying temperatures of 54° to 66° C. (130° to 150° F.), preferably 60° C. (140° F.). It is desirable to provide a uniaxially shrinkable film which is resistant to elongation under the tensions 17.8 to 178 g per cm (0.10 to 1.0 pli (pounds per linear inch)), preferably 134 g per linear cm (0.75 pli), and temperatures normally encountered by the film during processes prior to thermoshrinking, e.g., drying after printing. To avoid registration problems during printing, MD elongation at 134 g per linear cm (0.75 pli) should be less than about 0.6% at 60° C. (140° F.), preferably less than 0.4%. MD elongation is generally reduced and is thus less of a problem as secondary stretching (MD orientation) is increased.

Especially preferred films of the present invention show minimal MD elongation and TD shrinkage at processing temperatures of 60° C. and 134 g/cm (0.75 pli), and maximum MD shrinkage at temperatures used to effect shrinkage, e.g., heat tunnel temperatures of 127° to 141° C. (260° to 285° F.), preferably 135° C. (275° F.) or higher, depending on residence time.

The invention is illustrated by the following non-limiting examples in which all parts are by weight unless otherwise specified.

EXAMPLES

Example 1

Isotactic polypropylene (MP=160° C. (320° F.), melt index=3), is melted in an extruder with a screw of L/D ratio of 20/1 to provide the core layer. A second extruder, in association with the first extruder, is supplied with an ethylene-propylene copolymer (2% ethylene content) to provide the skin layers. A melt coextrusion is carried out while maintaining the cylinder of the core polymer material at a temperature sufficient to melt the polymer mixture, i.e., from 232° C. to 288° C. (450° F. to about 550° F.) or higher. The E-P copolymers in the second extruder to be extruded as skin layers are maintained at about the same temperature as the polypropylene used in fabricating the core layer. The E-P copolymer of the second extruder is split into two streams to enable the formation of skin layers on each surface of the core layer. As may be appreciated by those skilled in the art, rather than splitting the output of the second extruder into two streams, a third extruder could be used to supply the second skin layer. Such an arrangement would be desired when the material used to form the second skin layer is varied from that of the first skin layer, when the thickness of the second skin layer is varied from that of the first skin layer, etc.

A three-layer film laminate was coextruded with a core thickness representing about 95 percent of the overall extruded thickness, with the thicknesses of the skin layers representing about 5 percent of the film thickness. The unoriented film measured about 50 mils in thickness. The resultant film sheet was subsequently oriented 4.5 by 8 times using a commercially available sequential biaxially orienting apparatus to provide a multi-layer film structure. The machine direction (MD) orientation is conducted at 127° C. (260° F.) and the transverse direction (TD) orientation is conducted at 149° C. (300° F.). The resultant film is thereafter collected or secondarily oriented by stretching on a heated roll (230° F.) directly after the TD orienter. Samples are collected which are secondarily oriented by MD stretching at 0%, 10%, 20%, 25% and 30% based on secondary orienter settings (roll speed). The resulting samples were tested for dimensional stability at 107° C., 116° C., and 135° C. (225° F., 240° F., and 275° F.), haze (% light transmission) and evaluated with respect to operability, i.e., the tendency of the film to split or otherwise fail while undergoing secondary orientation. The results of the tests are set out in Tables 1 and 2 below.

Example 2

Example 1 was repeated except that the polypropylene of the core layer was modified by adding 5 wt % ethylene-propylene copolymer (Fina E-P 8573).

Example 3

Example 1 was repeated except that the polypropylene of the core layer was modified by adding 10 wt % ethylene-propylene copolymer (Fina E-P 8573).

Example 4 (Comparative)

Example 1 was repeated except that the polypropylene of the core layer was substituted with a high crystalline, high isotacticity polypropylene. The high crystallinity polypropylene was Fina 3576X. The resulting multilayer film was difficult to secondarily orient and exhibited poor operability.

Example 5

Example 1 was repeated except that the polypropylene of the core layer was modified by adding 3 wt % polybutene-1 polymer (Shell 8430).

Example 6

Example 1 was repeated except that the polypropylene of the core layer was modified by adding 5 wt % polybutene-1 polymer (Shell 8430).

Example 7

Example 1 was repeated except that the polypropylene of the core layer was modified by adding 10 wt % polybutene-1 polymer (Shell 8430).

Example 8

Example 1 was repeated except that the polypropylene of the core layer was substituted by fractional copolymer of ethylene and propylene (0.6 wt % ethylene) (Fina 4371).

Example 9

Example 1 was repeated except that the isotactic polypropylene of the core layer was modified by the addition of atactic polypropylene (15% atacticity) to provide a mixture containing 25 wt % atactic polypropylene (Novolen L1300, available from BASF).

Example 10

Example 1 was repeated except that the isotactic polypropylene of the core layer was modified by the addition of atactic polypropylene (15% atacticity) to provide a mixture containing 50 wt % atactic polypropylene (Novolen L1300, available from BASF).

Example 11

Example 1 was repeated except that the isotactic polypropylene of the core layer was modified by the addition of atactic polypropylene (15% atacticity) to provide a mixture containing 15 wt % atactic polypropylene (Novolen L1300, available from BASF).

These examples demonstrate that films whose core layers are comprised of polypropylene having low inherent crystallinity, or polypropylene modified by addition of atactic polypropylene, polybutene-1, E-P copolymer, or fractional E-P copolymer, so as to provide a core layer of lower crystallinity, can be effectively secondarily oriented to provide uniaxially shrinkable films acceptable dimensional stability along the other axis.

Examples 12 to 37

Core: For this series of experiments, isotactic polypropylene (MP=160° C. (320° F.), melt index=3), Fina 3371, available from Fina, is employed as the isotactic propylene homopolymer component of the core layer. In Examples 12 to 19, 21 to 24, and 32 to 37, modifiers such as syndiotactic polypropylene alone, ethylene-propylene copolymer alone and mixtures thereof are added to the core layer in the amounts shown in Tables 3 and 4 (relating to Examples 12 to 25 and Examples 26 to 37, respectively). Examples 12 to 19 and 21 to 24 utilize EOD 9306, obtained from Fina, as the syndiotactic polypropylene, while Examples 32 to 37 utilize EOD 9502, obtained from Fina. The E-P copolymer used is Fina 8573, also available from Fina.

Example 20 relates to a film having a core of 100% isotactic polypropylene (4 to 5% atacticity).

Example 25 relates to a film having a core containing 15 wt % atactic polypropylene having an atacticity of 15 wt % as modifier (Novolen 1300L, available from BASF) providing an added overall core atacticity of 2.25 wt %.

Examples 26 to 29 relate to a film having a core containing 5 wt % to 10 wt % linear low density polyethylene (LLDPE) utilizing Exxon 2009 or Exxon 3016 LLDPE, available from Exxon Chemical Co.

Examples 30 and 31 utilize 10 wt % to 20 wt % ethylene-propylene-butylene terpolymer modifier in the core (Chisso 7880, available from Chisso).

The core component(s) were melted in an extruder with a screw of L/D ratio of 20/1 to provide the core layer. A second and third extruder, in association with the first extruder, is supplied with an ethylene-propylene-butylene terpolymer (Chisso 7701, (3.3% ethylene, 3.8% butylene content, MFI= 5.1)) to provide the two skin layers, one of which contains 2000 ppm Tospearl, a polymethylsilsesquioxane nonmeltable silicone resin, as antiblock. A melt coextrusion was carried out while maintaining the cylinder of the core polymer material at a temperature sufficient to melt the polymer mixture, i.e., from 232° C. to 288° C. (450° F. to 550° F.) or higher. The terpolymers in the second extruder and third extruder to be extruded as skin layers were maintained at about the same temperature as the components used in fabricating the core layer. The two streams of E-P-B terpolymer of the second and third extruder enable the formation of skin layers on each surface of the core layer.

A three-layer film laminate was coextruded with a core thickness representing about 95 percent of the overall extruded thickness, with the thicknesses of the skin layers representing about 5 percent of the film thickness. The unoriented film measured 1270 microns (50 mils) in thickness. The resultant film sheet was subsequently oriented 4.5 by 8 times using a commercially available sequential biaxially orienting apparatus to provide a multi-layer film structure. The machine direction (MD) orientation is conducted at 127° C. (260° F.) and the transverse direction (TD) orientation is conducted at 149° C. (300° F.). The resultant film is thereafter collected or secondarily oriented by stretching on a roll heated at 110° C. (230° F.) directly after the TD orienter. Samples are collected which are secondarily oriented by MD stretching. Secondary MD stretch can be measured as the percentage of increase in length of the film after secondary orientation. Such secondary stretch can be reported as either i) roll speeds of the secondary orienter (computer) or preferably, ii) actual stretching as determined by the difference in film speeds as measured by tachometers measuring film speeds at the rollers before and after the secondary stretching zone. Computer settings range from above 0% to 40% while actual secondary stretching ranges (which are devoid of slippage error) are somewhat lower (ranging from above 0 to 30%). Both computer and actual secondary stretch are indicated in Tables 3 and 4.

The terpolymer skin on one side of the film was corona discharge treated while the terpolymer skin on the other side contained 2000 ppm of a polymethylesilsesquioxane material, Tospearl which was added prior to coextrusion.

The resulting samples were tested for dimensional stability (shrinkage(−) or expansion(+)) in machine direction (MD)—i.e., the direction of secondary orientation, as well as transverse direction (TD) at 99° C., 116° C., and 135° C. (210° F., 240° F., and 275° F.).

MD Tensile of the samples was measured three ways using ASTM D-882-Modulus (1000 pounds per square inch (KSI), 70.4 kg per square centimeter), Tensile Elongation (%) and Ultimate (KSI). The results of all three methods are set out in Tables 3 and 4.

MD elongation at 60° C. (140° F.) was measured at 44.5 grams per linear cm (0.25 pli (pounds per linear inch)), 89.0 grams per linear cm (0.50 pli), and 133.5 grams per linear cm (0.75 pli). The results are set out in Tables 3 and 4. FIG. 1 depicts MD elongation (%) over the range of 44.5 grams per linear cm to 133.5 grams per linear cm (0.25 pli to 0.75 pli) for Examples 17 and 33 to 37. FIG. 1 shows that elongation at higher tension (44.5 g/cm (0.75 pli)) generally increases with E-P copolymer content and syndiotactic polypropylene content.

Figure 2:
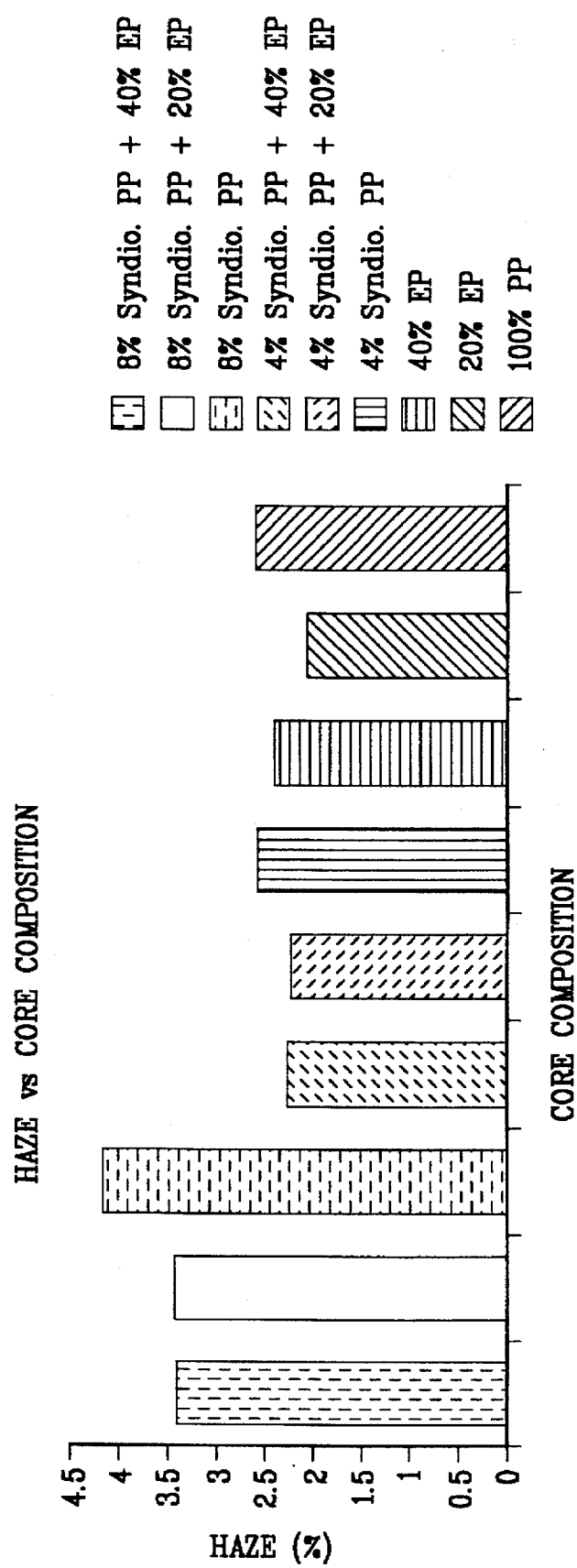
FIG. 2 depicts haze (%) vs. core composition for Examples 12 to 20.

Haze (% light transmission) was measured by ASTM D-1003 and is set out in Tables 3 and 4. FIG. 2 depicts haze vs. core composition for Examples 12 to 20. At high levels of syndiotactic polypropylene alone (8%), haze is high while addition of ethylene-propylene copolymer reduces haze somewhat. Lower levels of syndiotactic PP copolymer (4%) provide acceptable haze levels which are further reduced by EP copolymer addition to levels below that of 100% homopolymer core alone.

Figure 3:
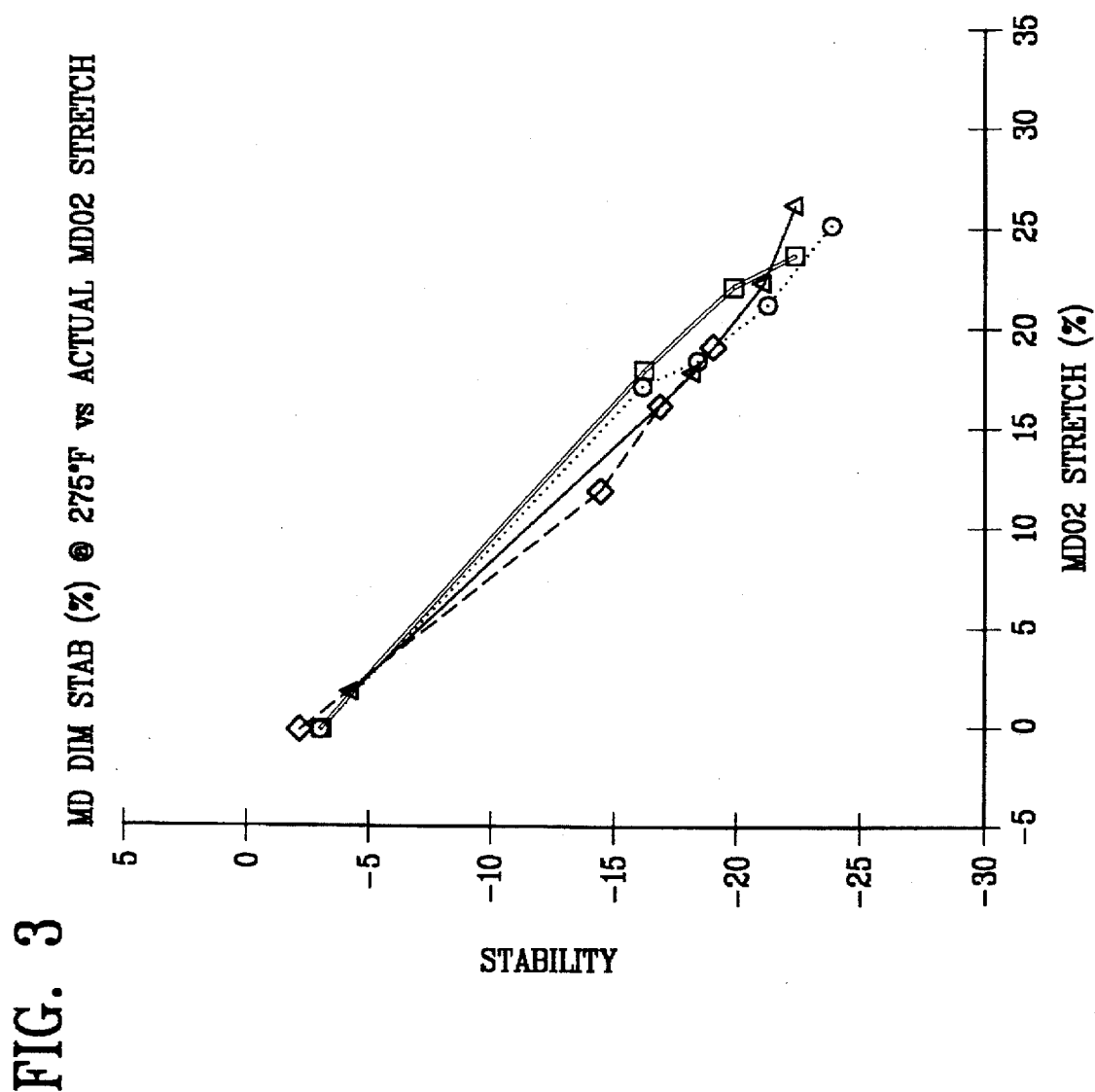
FIG. 3 depicts MD dimensional stability at 135° C. (275° F.) vs actual secondary machine direction stretch (MDO2) for films having 40% EP-containing cores (Examples 12, 15, 18, and 20).

FIG. 3 depicts MD dimensional stability at 135° C. (275° F.) vs actual secondary machine direction stretch (MDO2) for films having 40% EP-containing cores (Examples 12, 15, 18, and 20 having cores of 8% syndiotactic PP+40% EP copolymer, 4% syndiotactic PP+40% EP copolymer, 40% EP copolymer, and 100% homopolymer PP (Comparative), respectively. Secondary orientation (MDO2 stretch) for 100% homopolymer is limited to about 19%. The greatest MDO2 stretch was obtained for Example 12, 8% syndiotactic PP+40% EP copolymer, while the greatest shrinkage at 135° C. (275° F.) was obtained for Example 18 which contained 40% EP copolymer alone as modifier in the core.

Figure 4:
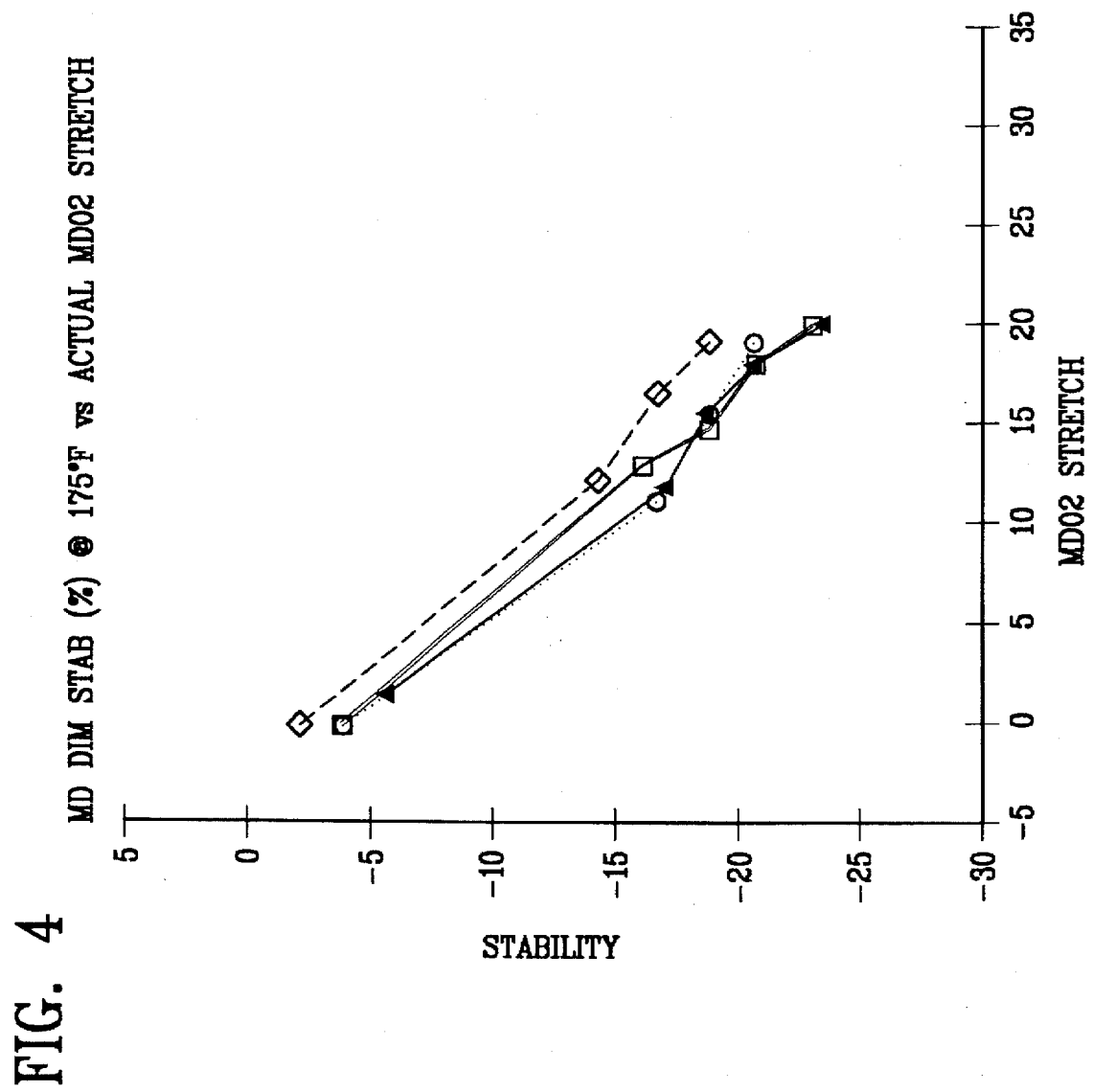
FIG. 4 depicts MD dimensional stability at 135° C. (275° F.) vs actual secondary machine direction stretch (MDO2) for films having 20% EP-containing cores.

FIG. 4 depicts MD dimensional stability at 135° C. (275° F.) vs actual secondary machine direction stretch (MDO2) for films having 20% EP-containing cores (Examples 13, 16, 19, and 20 relating to films having cores of 8% syndiotactic PP+20% EP copolymer, 4% syndiotactic PP+20% EP copolymer, 20% EP copolymer, and 100% homopolymer PP (Comparative), respectively.) The greatest MDO2 stretch and MD dimensional stability (shrinkage at 135° C. (275° F.)) was obtained for Example 13 (8% syndiotactic PP+20% EP copolymer) and Example 16 (4% syndiotactic PP+20% EP copolymer). Overall, the 20% EP-containing materials while exhibiting less MDO2 stretch than the 40% EP-containing materials of FIG. 3, exhibit comparable or greater shrinkage at 135° C. (275° F.).

Figure 5:
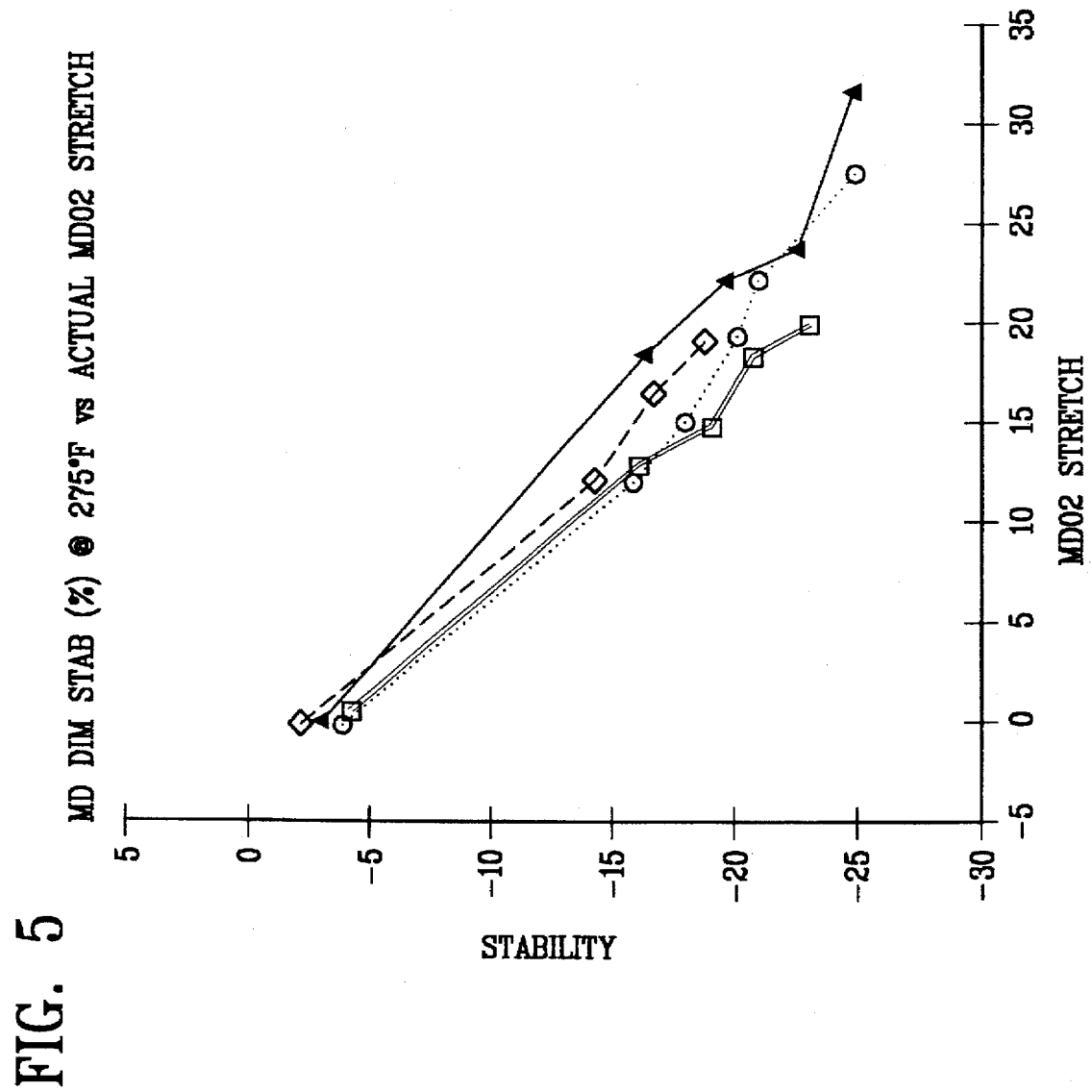
FIG. 5 depicts MD dimensional stability at 135° C. (275° F.) vs actual secondary machine direction stretch (MDO2) for films having 4% syndiotactic polypropylene-containing cores.

FIG. 5 depicts MD dimensional stability at 135° C. (275° F.) vs actual secondary machine direction stretch (MDO2) for films having 4% syndiotactic polypropylene-containing cores (Examples 15, 16, 17, and 20 having cores of 4% syndiotactic PP+40% EP copolymer, 4% syndiotactic PP+20% EP copolymer, 4% syndiotactic PP, and 100% homopolymer PP (Comparative), respectively.) High secondary orientation (MDO2 stretch) of about 32% was obtained for Example 15, (4% syndiotactic PP+40% EP copolymer) although Example 17 containing 4% syndiotactic PP alone as core modifier exhibited MDO2 stretch nearly as high (27%) while obtaining the same shrinkage as Example 15 (25%).

Figure 6:
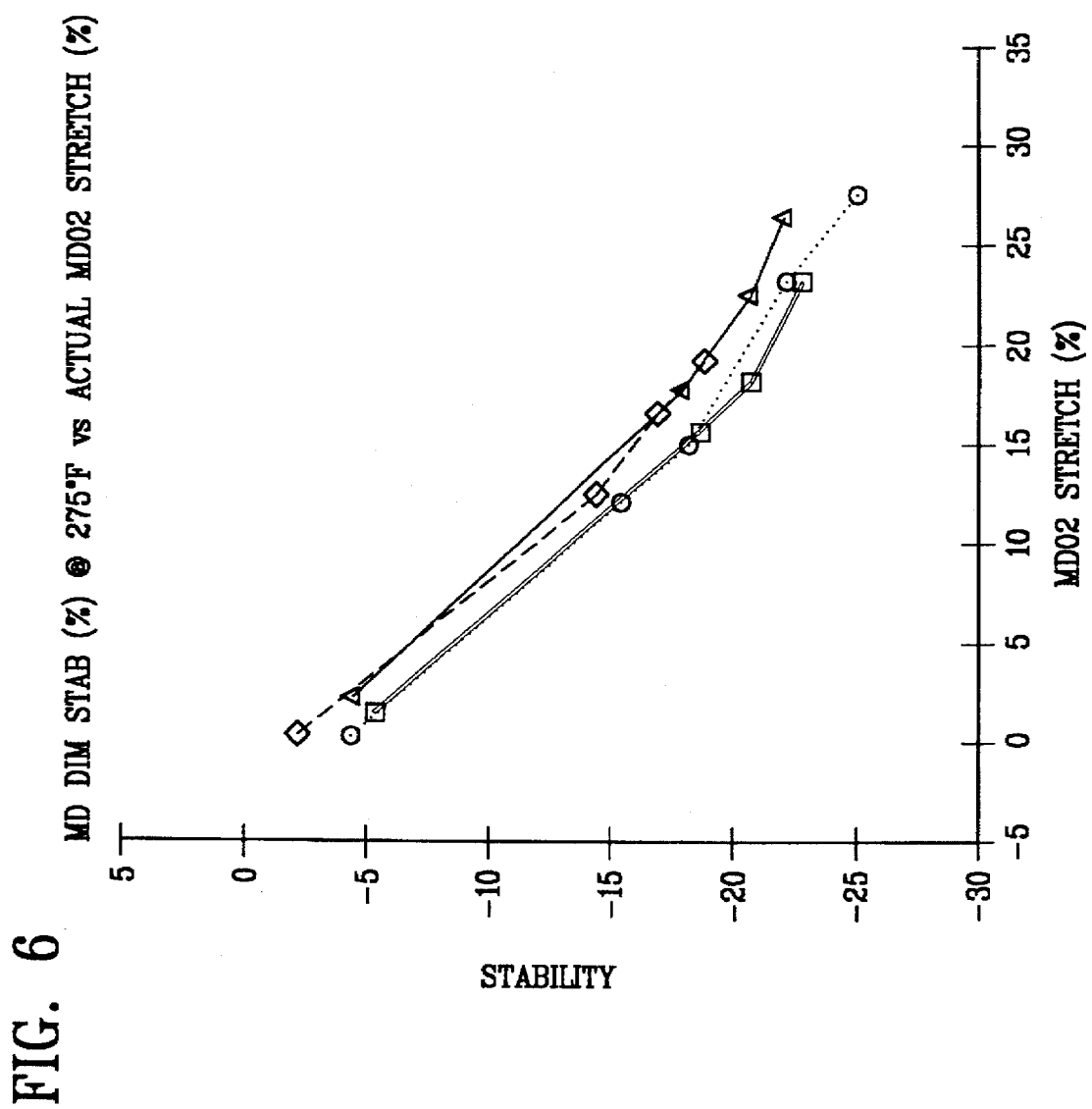
FIG. 6 depicts MD dimensional stability at 135° C. (275° F.) vs actual secondary machine direction stretch (MDO2) for films having 8% syndiotactic polypropylene-containing cores.

FIG. 6 depicts MD dimensional stability at 135° C. (275° F.) vs actual secondary machine direction stretch (MDO2) for films having 8% syndiotactic polypropylene-containing cores (Examples 12, 13, 14, and 20 having cores of 8% syndiotactic PP+40% EP copolymer, 8% syndiotactic PP+20% EP copolymer, 8% syndiotactic PP, and 100% homopolymer PP (Comparative), respectively.) Relative to the 4% syndiotactic polypropylene-containing cores of FIG. 5, somewhat lower secondary orientations (MDO2 stretch) (26% and 27%) were obtained for Examples 12 and 14, (8% syndiotactic PP+40% EP copolymer and 8% syndiotactic polypropylene) although Example 14 containing 8% syndiotactic PP alone as core modifier exhibited MDO2 stretch nearly as high as the 4% syndiotactic polypropylene-containing films in FIG. 5.

Figure 7:
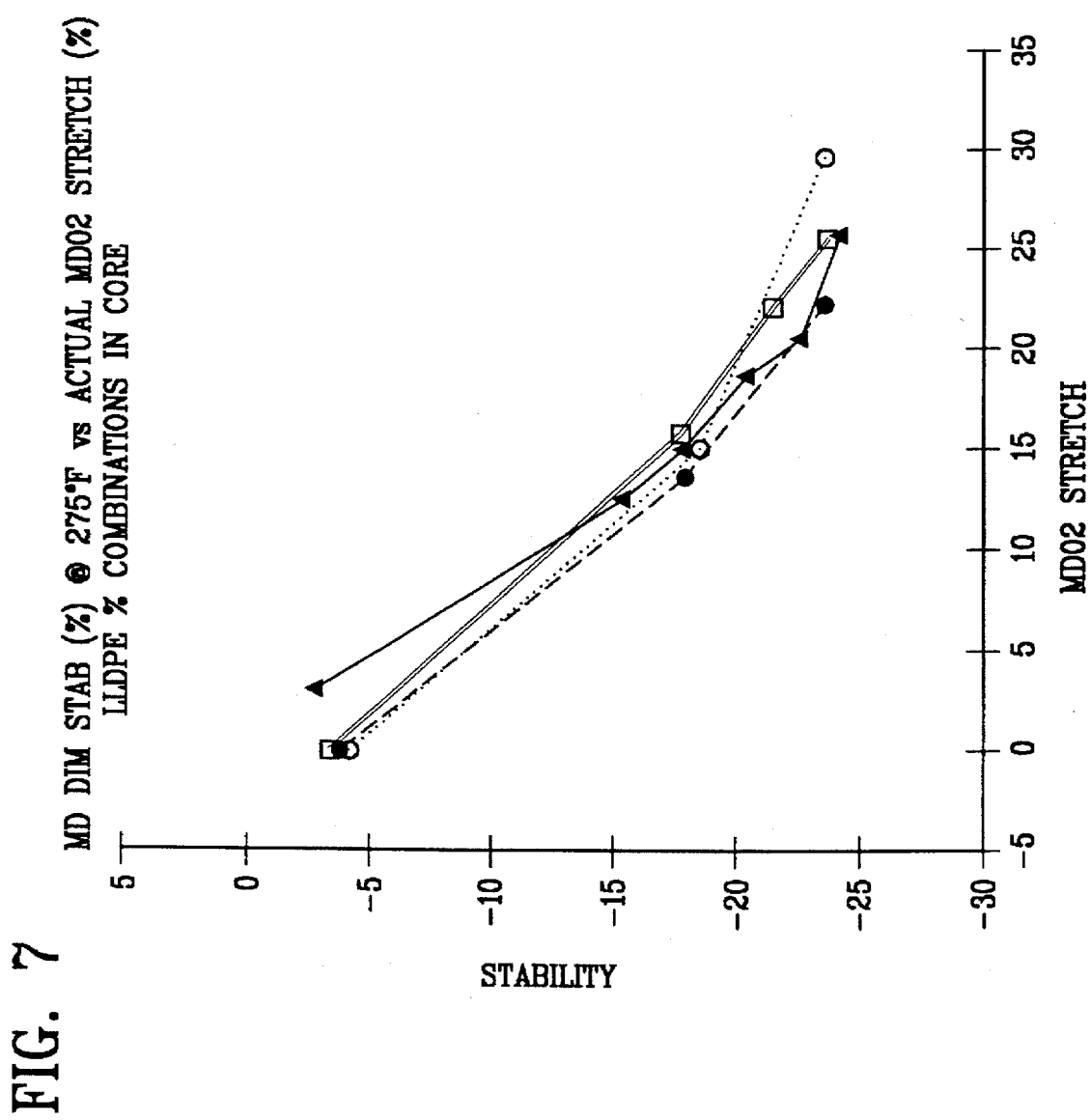
FIG. 7 depicts MD dimensional stability at 135° C. (275° F.) vs actual secondary machine direction stretch (MDO2) for films having 5% to 10% linear low density polyethylene (LLDPE)-containing cores.

FIG. 7 depicts MD dimensional stability at 135° C. (275° F.) vs actual secondary machine direction stretch (MDO2) for films having 5% to 10% linear low density polyethylene (LLDPE)-containing cores (Examples 26, 27, 28, and 29 having cores of 5% Exxon 2009, 10% Exxon 2009, 5%

Exxon 3016, and 10% Exxon 3016, respectively.) High secondary orientation (MDO2 stretch) (about 30%) was obtained for Example 28 and all Examples exhibited MDO2 stretch of about 24%.

Figure 8:
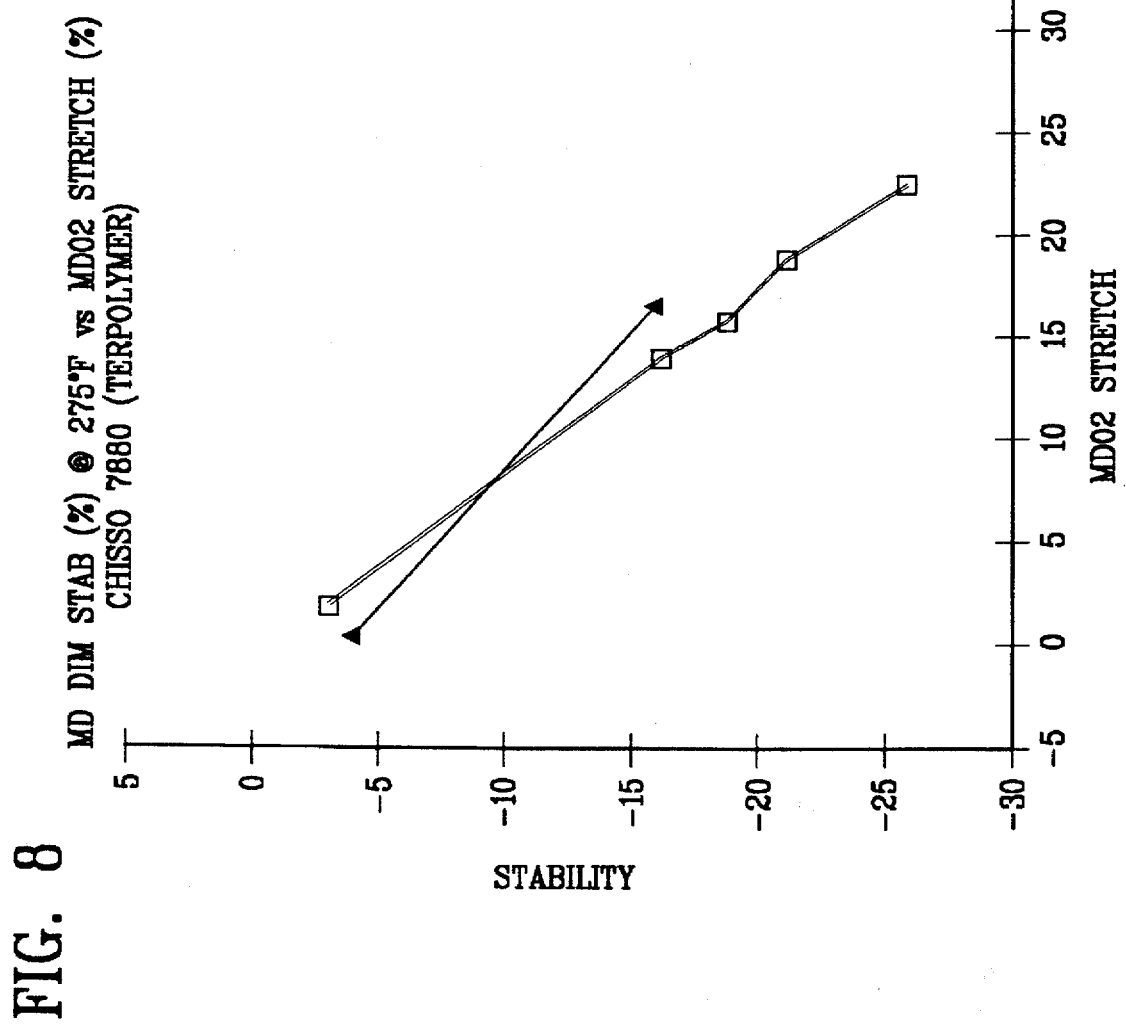
FIG. 8 depicts MD dimensional stability at 135° C. (275° F.) vs actual secondary machine direction stretch (MDO2) for films having 10% and 20% ethylene-propylene-butylene terpolymer (Chisso 7880)-containing cores.

FIG. 8 depicts MD dimensional stability at 135° C. (275° F.) vs actual secondary machine direction stretch (MDO2) for films having 10% and 20% ethylene-propylene-butylene terpolymer (Chisso 7880)-containing cores (Examples 30 and 31, respectively). High secondary orientation (MDO2 stretch) (about 30%) and MD dimension stability of about 26% was obtained for Example 31.

Figure 9:
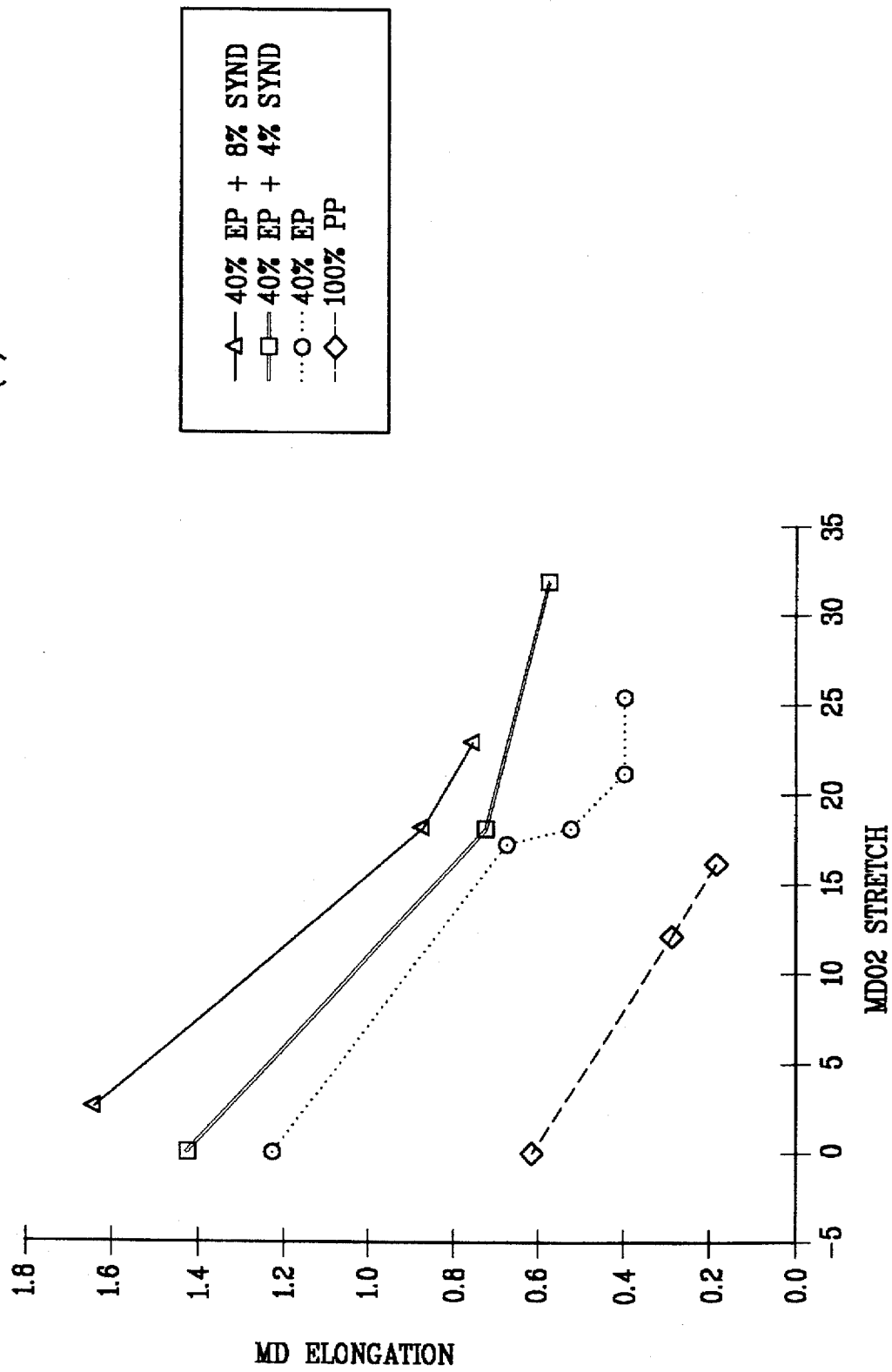
FIG. 9 depicts MD elongation at 60° C. (140° F.) and 134 g per linear cm (0.75 pli) vs actual secondary machine direction stretch (MDO2) for films having 40% EP-containing cores.

FIG. 9 depicts MD elongation at 60° C. (140° F.) and 133.5 grams per linear cm (0.75 pli) vs actual secondary machine direction stretch (MDO2) for films having 40% EP-containing cores (Examples 12, 15, 18, and 20 having cores of 8% syndiotactic PP+40% EP copolymer, 4% syndiotactic PP+40% EP copolymer, 40% EP copolymer, and 100% homopolymer PP (Comparative), respectively. All 40% EP copolymer-containing cores exhibited high MD elongation compared to the homopolymer-containing core.

Figure 10:
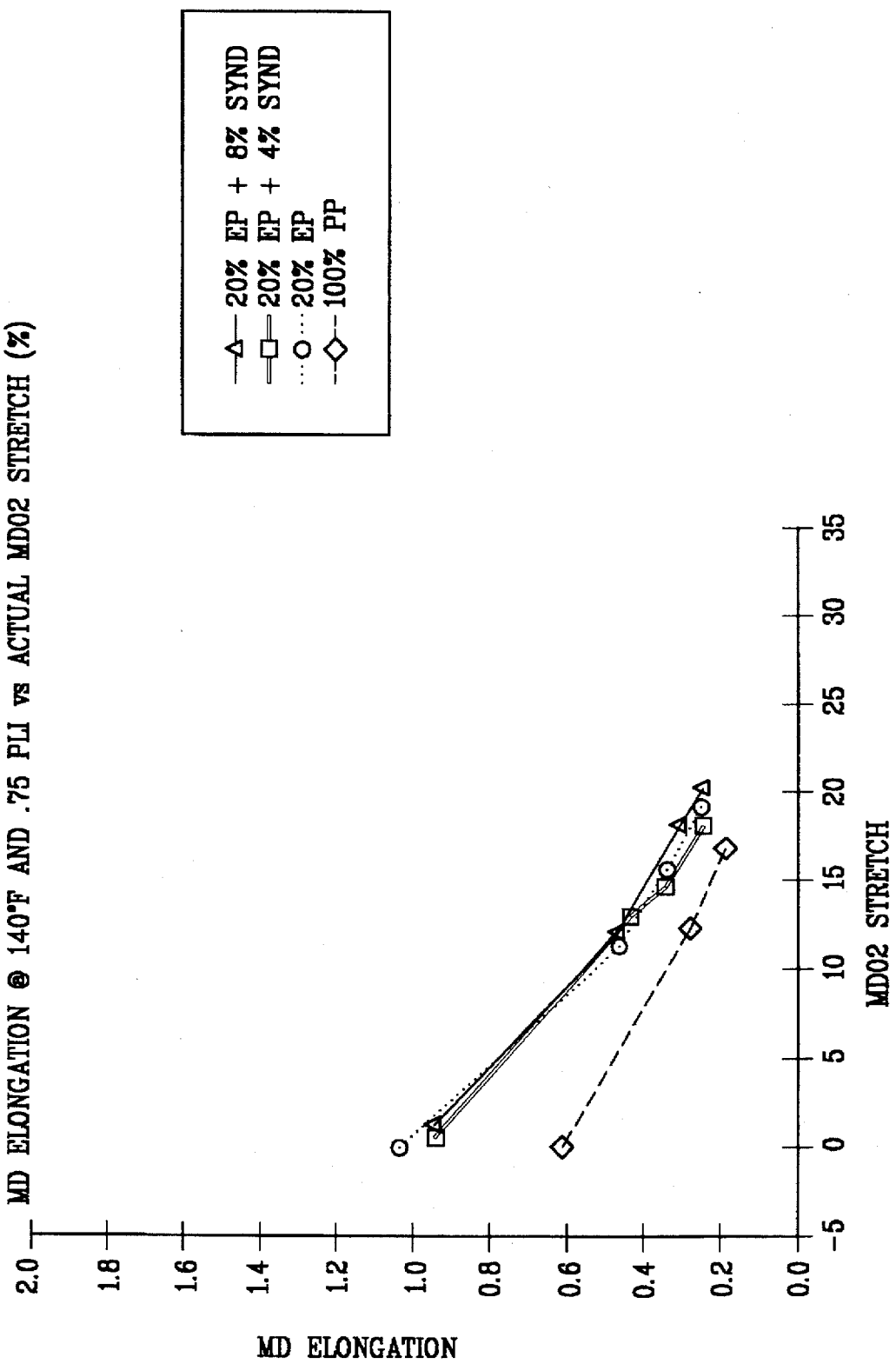
FIG. 10 depicts MD elongation at 60° C. (140° F.) and 134 g per linear cm (0.75 pli) vs actual secondary machine direction stretch (MDO2) for films having 20% EP-containing cores.

FIG. 10 depicts MD elongation at 60° C. (140° F.) and 133.5 grams per linear cm (0.75 pli) vs actual secondary machine direction stretch (MDO2) for films having 20% EP-containing cores (Examples 13, 16, 19, and 20 relating to films having cores of 8% syndiotactic PP+20% EP copolymer, 4% syndiotactic PP+20% EP copolymer, 20% EP copolymer, and 100% homopolymer PP (Comparative), respectively.) All 20% EP copolymer-containing cores exhibited slightly higher MD elongation compared to the homopolymer-containing core.

Figure 11:
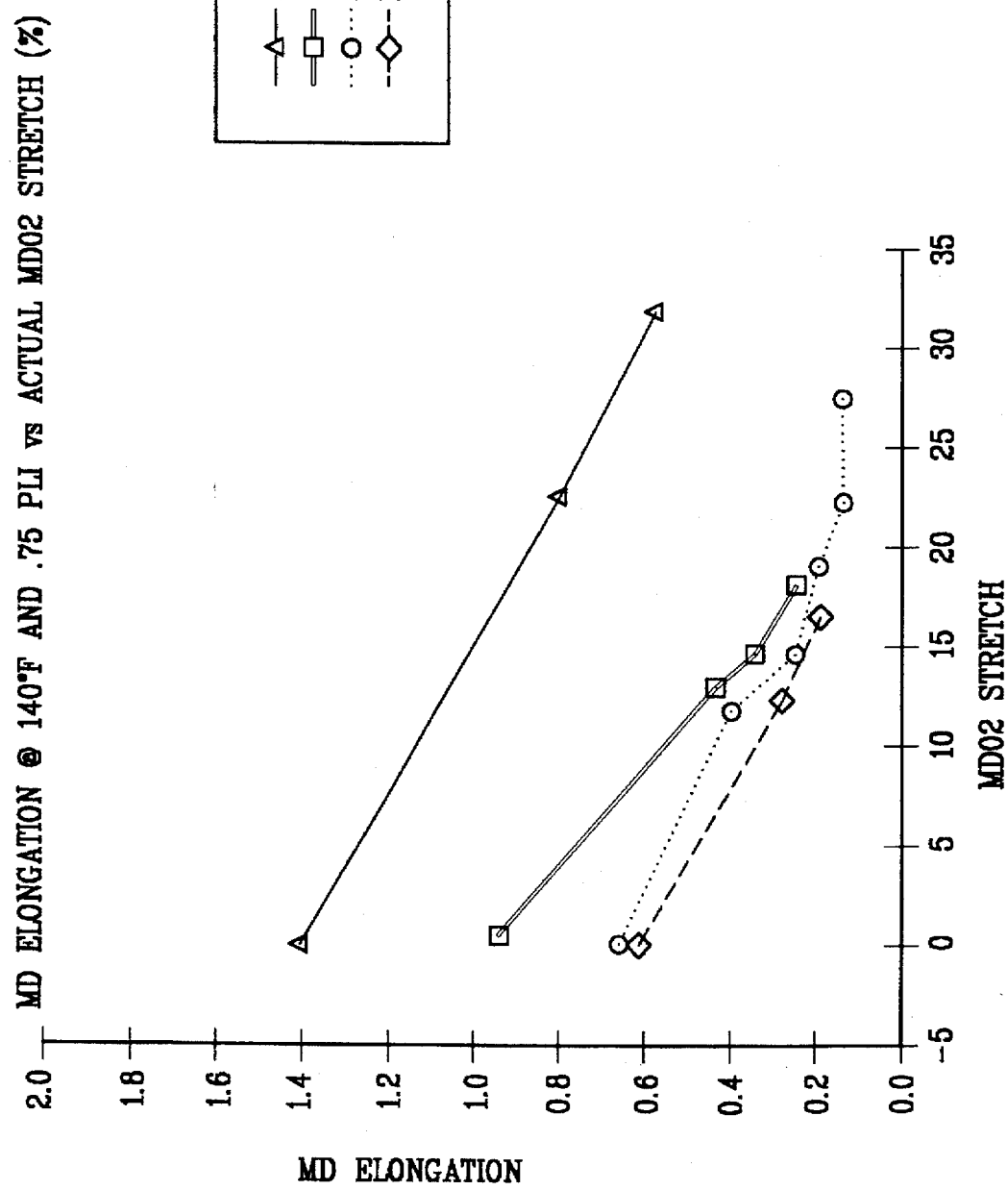
FIG. 11 depicts MD elongation at 60° C. (140° F.) and 134 g per linear cm (0.75 pli) vs actual secondary machine direction stretch (MDO2) for films having 4% syndiotactic polypropylene-containing cores.

FIG. 11 depicts MD elongation at 60° C. (140° F.) and 133.5 grams per linear cm (0.75 pli) vs actual secondary machine direction stretch (MDO2) for films having 4% syndiotactic polypropylene-containing cores (Examples 15, 16, 17, and 20 having cores of 4% syndiotactic PP+40% EP copolymer, 4% syndiotactic PP+20% EP copolymer, 4% syndiotactic PP, and 100% homopolymer PP (Comparative), respectively.) The film of Example 17 containing 4% syndiotactic polypropylene alone exhibited excellent MD elongation properties even at high MDO2 stretch levels.

Figure 12:
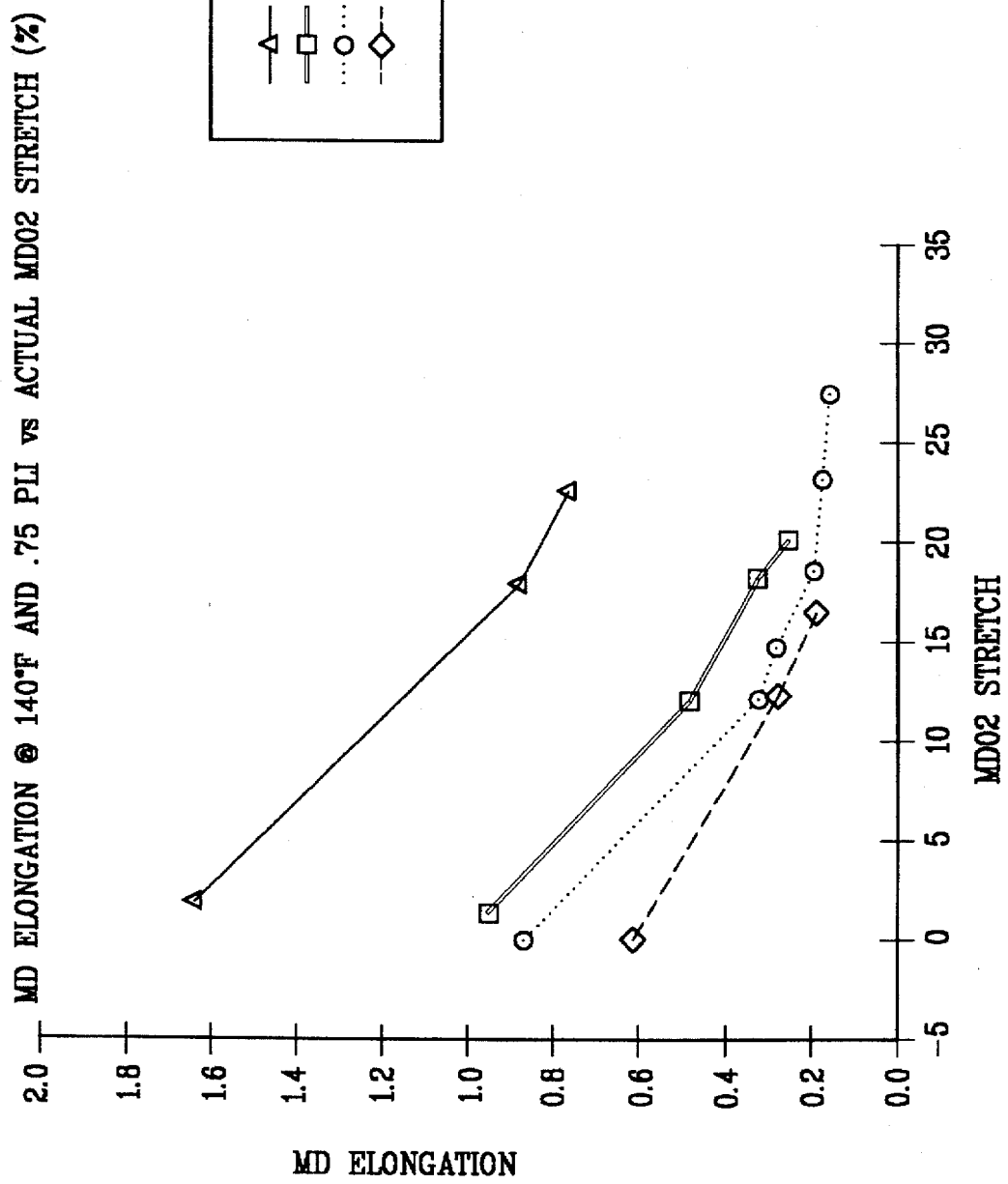
FIG. 12 depicts MD elongation at 60° C. (140° F.) and 134 g per linear cm (0.75 pli) vs actual secondary machine direction stretch (MDO2) for films having 8% syndiotactic polypropylene-containing cores.

FIG. 12 depicts MD elongation at 60° C. (140° F.) and 133.5 grams per linear cm (0.75 pli) vs actual secondary machine direction stretch (MDO2) for films having 8% syndiotactic polypropylene-containing cores (Examples 12, 13, 14, and 20 having cores of 8% syndiotactic PP+40% EP copolymer, 8% syndiotactic PP+20% EP copolymer, 8% syndiotactic PP, and 100% homopolymer PP (Comparative), respectively.) The film of Example 14 containing 8% syndiotactic polypropylene alone exhibited excellent MD elongation properties even at high MDO2 stretch levels.

Figure 13:
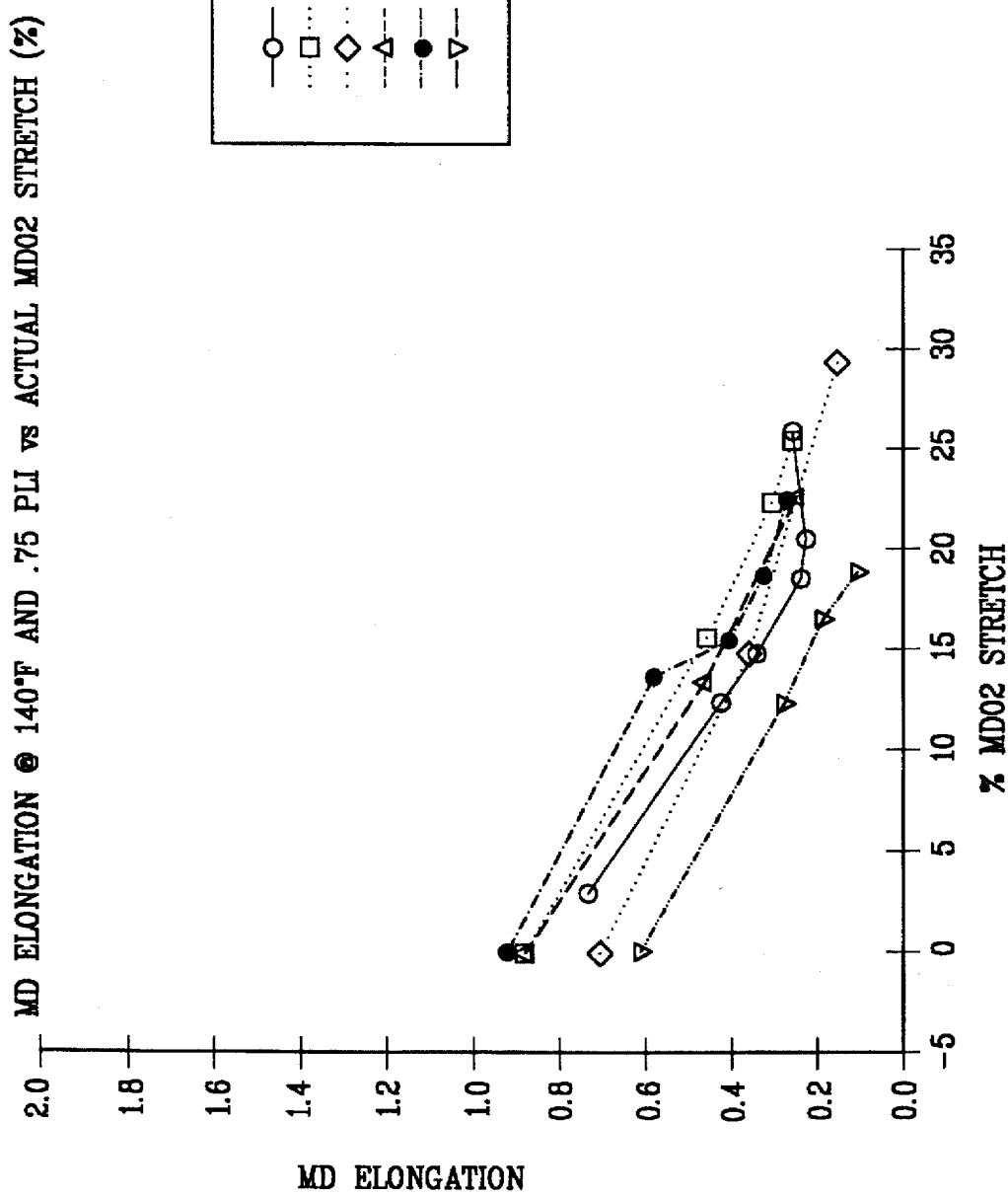
FIG. 13 depicts MD elongation at 60° C. (140° F.) and 134 g per linear cm (0.75 pli) vs actual secondary machine direction stretch (MDO2) for films having 5% to 10% linear low density polyethylene (LLDPE)-containing cores as well as films having 20% ethylene-propylene-butylene terpolymer (Chisso 7880)-containing cores and 100% homopolymer PP core.

FIG. 13 depicts MD elongation at 60° C. (140° F.) and 133.5 grams per linear cm (0.75 pli) vs actual secondary machine direction stretch (MDO2) for films having 5% to 10% linear low density polyethylene (LLDPE)-containing cores (Examples 26, 27, 28, and 29 having cores of 5% Exxon 2009, 10% Exxon 2009, 5% Exxon 3016, and 10% Exxon 3016, respectively) as well as films having 20% ethylene-propylene-butylene terpolymer (Chisso 7880)-containing cores and 100% homopolymer PP core (Example 31 and Example 20 (Comparative), respectively). FIG. 12 shows that LLDPE-containing cores exhibit better MD elongation characteristics than do terpolymer-containing cores.

It will be apparent to those skilled in the art that the specific embodiments discussed above can be successfully repeated with ingredients equivalent to those generically or specifically set forth above and under variable process conditions. From the foregoing specification, one skilled in the art can readily ascertain the essential features of this invention and without departing from the spirit and scope thereof can adapt it to various diverse applications.

TABLE 1

DIMENSIONAL STABILITY (135° C. (275° F.))

| Ex. | CORE | | 0% MDO2 | 10% MDO2 | 20% MDO2 | 25% MDO2 | 30% MDO2 | HAZE (%) | OPERABILITY |
|---|---|---|---|---|---|---|---|---|---|
| 1 | PP | MD | −4.4 | −9.3 | −15.1 | −16.1 | −18.0 | | Poor |
| | | TD | −0.5 | +1.2 | +3.6 | +4.9 | +5.2 | | |
| 2 | PP + 5% EP | MD | −4.3 | −8.7 | −14.9 | — | −18.7 | >2 | Fair |
| | | TD | −1.5 | +0.7 | +3.3 | — | +5.0 | | |
| 3 | PP + 10% EP | MD | −4.6 | −9.6 | −16.5 | — | −18.8 | >2 | Fair |
| | | TD | −1.5 | +0.3 | +4.0 | — | +5.7 | | |
| 4 | PP High-cryst | MD | −2.7 | −9.3 | −13.5 | — | — | | Poor |
| | | TD | −1.0 | +1.7 | +3.2 | — | — | | |
| 5 | PP + 3% PB | MD | −5.5 | −11.9 | −18.2 | — | −20.0 | >2 | Poor |
| | | TD | −9.2 | −6.2 | −3.5 | — | −1.3 | | |
| 6 | PP + 5% PB | MD | −5.7 | — | −17.5 | — | −21.0 | >2 | Fair |
| | | TD | −9.2 | — | −2.9 | — | −0.9 | | |
| 7 | PP + 10% PB | MD | −5.5 | −9.2 | −18.0 | — | −21.3 | >2 | Fair |
| | | TD | −10.9 | −7.7 | −4.0 | — | −2.5 | | |
| 8 | Fract. copo EP | MD | — | −10.0 | −16.4 | −18.9 | −21.5 | 2 | Good |
| | | TD | — | +0.3 | +3.9 | −2.7 | +6.8 | | |
| 9 | PP + 25% ATAC. | MD | −3.5 | −8.9 | −15.0 | — | −19.3 | <2 | Good |
| | | TD | 0 | +2.2 | +4.7 | — | +7.2 | | |
| 10 | PP + 50% ATAC. | MD | — | −9.7 | −16.0 | — | −21.0 | <2 | Good |
| | | TD | — | +0.7 | +3.5 | — | +6.2 | | |
| 11 | PP + 15% ATAC. | MD | — | — | — | −19.0 | — | <2 | Good |
| | | TD | — | — | — | +0.7 | — | | |

TABLE 2

| EX | CORE | | DIMENSIONAL STABILITY (107° C. (225° F.)) | | | | | DIMENSIONAL STABILITY (116° C. (240° F.)) | | | | |
|---|---|---|---|---|---|---|---|---|---|---|---|---|
| | | | 0% MDO2 | 10% MDO2 | 20% MDO2 | 25% MDO2 | 30% MDO2 | 0% MDO2 | 10% MDO2 | 20% MDO2 | 25% MDO2 | 30% MDO2 |
| 1 | PP | MD | −3.5 | −5.2 | −8.7 | — | −10.7 | −2.5 | −6 | −10.0 | — | −9.5 |
| | | TD | +0.2 | +1.7 | +3.3 | — | +3.0 | +0.7 | +1.7 | +3.3 | — | +4.5 |
| 2 | PP + 5% EP | MD | −2.7 | −6 | −9 | — | −13.3 | −2.9 | −6.7 | −10.0 | — | −14.5 |
| | | TD | +.7 | +2 | +2.9 | — | +5.2 | +.7 | +1.9 | +3.3 | — | +5.3 |
| 3 | PP + 10% EP | MD | −2 | −5.5 | −10.0 | — | −12.2 | −2.7 | −5.9 | −12.5 | — | −13.3 |
| | | TD | +.7 | +1.9 | +3.7 | — | +4.2 | +.2 | +2.0 | +4.2 | — | +5.0 |
| 4 | PP High-cryst | MD | −1.5 | −6.7 | −10.0 | — | — | −2.3 | −7.5 | −11.2 | — | — |
| | | TD | 0 | +2.2 | +3.3 | — | — | +0.2 | +2.3 | +3.5 | — | — |
| 5 | PP + 3% PB | MD | −3.0 | −7.7 | −12.0 | — | −14.9 | −3 | −8.5 | −13.3 | — | −16.5 |
| | | TD | −1.7 | +1 | −3 | — | +4.3 | −3.2 | +0 | +1.9 | — | +3.5 |
| 6 | PP + 5% PB | MD | −2.7 | −3.5 | −12.3 | — | −15.0 | −3.3 | −3.5 | −13.3 | — | −16.5 |
| | | TD | −1.3 | +.9 | +3.0 | — | −4.9 | −3.0 | −3.0 | +2.0 | — | +4.2 |
| 7 | PP + 10% PB | MD | −3.0 | −8.5 | −12.3 | — | −15.3 | −3.3 | −8.7 | −13.7 | — | −16.5 |
| | | TD | −2.3 | +0.7 | +2.9 | — | +4.5 | −3.7 | −0.7 | +1.5 | — | +3.7 |
| 8 | Fract. copo | MD | — | — | — | −11.7 | — | — | — | — | −13.3 | — |
| | | TD | — | — | — | +3.7 | — | — | — | — | +3.3 | — |
| 11 | OPP + 15% ATAC. | MD | — | — | — | −12.3 | — | — | — | — | −14.0 | — |
| | | TD | — | — | — | +3.3 | — | — | — | — | +3.3 | — |

TABLE 3

| Example | Core Comp. | MDO2 Computer | MDO2 Tach | Dim. Stab. 99° C. (210° F.) MD | Dim. Stab. 99° C. (210° F.) TD | Dim. Stab. 116° C. (240° F.) MD | Dim. Stab. 116° C. (240° F.) TD | Dim. Stab. 135° C. (275° F.) MD | Dim. Stab. 135° C. (275° F.) TD | MD Modulus (KSI) | TENSILE Elongation (%) | Ultimate (KSI) | MD Elongation 60° C. (140° F.) .25 pli | MD Elongation 60° C. (140° F.) .50 pli | MD Elongation 60° C. (140° F.) .75 pli | Haze (%) |
|---|---|---|---|---|---|---|---|---|---|---|---|---|---|---|---|---|
| 12 | 8% Syndio PP + (40% EP Copolymer) | 0 | 2 | −1.7 | +0.6 | −2.9 | −0.2 | −4.3 | −4.0 | 189 | 254 | 15.2 | .5 | .975 | 1.65 | 3.1 |
| | | 20 | 17.9 | −9.3 | +1.3 | −14.7 | −0.5 | −18.0 | −2.9 | 192 | 205 | 16.9 | .163 | .475 | .875 | 3.5 |
| | | 25 | 22.4 | −10.6 | +1.5 | −16.7 | +1.3 | −21.0 | −2.5 | 198 | 160 | 16.2 | .038 | .375 | .75 | 3.2 |
| | | 35 | 26.3 | −11.9 | +2.2 | −19.7 | +2.0 | −22.5 | −1.5 | 198 | 141 | 16.4 | — | .25 | — | 3.6 |
| 13 | 8% Syndio. PP + 20% EP Coplym. | 0 | 1.3 | −2.3 | +0.5 | −3.7 | −1.2 | −5.3 | −6.7 | 228 | 183 | 16.7 | .338 | .6 | .95 | 3.5 |
| | | 20 | 12.0 | −9.5 | +1.9 | −13.2 | +1.2 | −16.7 | −3.3 | 235 | 145 | 18.5 | — | .213 | .475 | 3.3 |
| | | 25 | 15.5 | −11.3 | +2.1 | −15.0 | +2.0 | −18.7 | −3.0 | 240 | 129 | 18.8 | .413 | .575 | .60 | 3.3 |
| | | 30 | 18.2 | −12.4 | +2.0 | −17.3 | +2.0 | −20.8 | −3.0 | 241 | 130 | 19.6 | — | .125 | .313 | 3.9 |
| | | 35 | 20.1 | −15.2 | +2.9 | −20.3 | +3.0 | −23.2 | −2.0 | 250 | 124 | 20.5 | — | .038 | .25 | 3.1 |
| 14 | 8% Syndio. PP | 0 | 0 | −1.3 | −0.2 | −2.3 | −2.0 | −4.2 | −7.2 | 262 | 187 | 18.8 | .338 | .562 | .863 | 4.2 |
| | | 20 | 12.0 | −9.7 | +1.7 | −12.5 | +1.0 | −15.5 | −3.5 | 273 | 137 | 20.6 | — | .08 | .313 | 4.4 |
| | | 25 | 14.6 | −11.5 | +2.3 | −14.7 | +1.5 | −18.2 | −2.7 | 279 | 130 | 21.1 | — | .075 | .25 | 4.5 |
| | | 30 | 18.2 | −12.7 | +3.2 | −16.3 | +3.0 | −18.7 | +0.7 | 283 | 130 | 21.9 | — | — | .863 | 4.3 |
| | | 35 | 23.1 | −14.0 | +3.0 | −19.2 | +3.0 | −22.7 | −0.4 | 292 | 110 | 2.1 | — | — | .313 | .4 |
| | | 40 | 27.3 | −15.1 | +3.3 | −20.7 | +3.3 | −25.3 | +1.0 | 301 | 93 | 21.6 | — | — | .275 | 3.9 |
| 15 | 4% Syndio. PP + 40% EP Copolym. | 0 | 0 | −1.0 | 0 | −1.1 | −0.9 | −2.9 | −5.5 | 195 | 262 | 15.6 | .563 | .975 | 1.413 | 2.3 |
| | | 20 | 18.0 | −9.0 | +1.2 | −13.3 | +1.0 | −16.2 | −3.4 | 203 | 158 | 15.5 | — | .313 | .725 | 2.6 |
| | | 25 | 22.1 | −8.9 | +1.0 | −14.9 | +0.7 | −19.7 | −2.8 | 209 | 175 | 18.3 | .088 | .4 | .788 | 2 |
| | | 30 | 23.9 | −12.4 | +1.4 | −18.0 | +2.0 | −22.5 | −2.2 | 217 | 145 | 18.3 | — | .2 | .5 | 2.6 |
| | | 35 | 31.5 | −11.5 | +1.2 | −18.9 | +1.7 | −25.0 | −2.0 | 216 | 139 | 18.8 | — | .25 | .563 | 1.9 |
| 16 | 4% Syndio. PP + 20% EP Copolym. | 0 | 0.6 | −1.5 | 0 | −2.0 | −2.0 | −3.9 | −7.0 | 238 | 200 | 17.9 | .35 | .6 | .938 | 2.3 |
| | | 20 | 12.8 | −10.2 | +1.9 | −13.3 | +1.5 | −16.0 | −3.2 | 248 | 154 | 19.6 | — | .188 | .438 | 2.2 |
| | | 25 | 14.6 | −11.5 | +2.5 | −15.2 | +2.2 | −18.9 | −2.2 | 253 | 150 | 20.8 | — | .125 | .35 | 2.2 |
| | | 30 | 18.2 | −12.4 | +3.3 | −17.0 | +3.2 | −21.0 | −1.2 | 254 | 123 | 20.1 | — | .038 | .25 | 2.3 |
| | | 35 | 20.1 | −14.8 | +3.1 | −19.5 | +3.7 | −23.0 | −1.2 | 266 | 124 | 20.9 | — | .1 | .313 | 2.3 |
| 17 | 4% Syndio. PP | 0 | 0 | −1.1 | −0.3 | −2.3 | −1.9 | −3.7 | −7.2 | 276 | 177 | 191 | .223 | .463 | .65 | 2.7 |
| | | 20 | 12.0 | −10.0 | +2.4 | −12.4 | +2.0 | −15.7 | −2.0 | 277 | 160 | 22.1 | — | .125 | .4 | 2.6 |
| | | 25 | 14.6 | −11.5 | +3.2 | −14.8 | +2.8 | −17.7 | −0.9 | 287 | 140 | 21.4 | — | .063 | .25 | 2.7 |
| | | 30 | 19 | −13.8 | +3.7 | −16.9 | +3.3 | −20.2 | +0.2 | 282 | 126 | 20.8 | — | — | .188 | 2.6 |
| | | 35 | 22.1 | −14.3 | +4.3 | −19.4 | +3.0 | −21.0 | +0.2 | 302 | 108 | 22.3 | — | — | .125 | 2.6 |
| | | 40 | 27.3 | −16.2 | +3.3 | −21.4 | +3.3 | −25.0 | +0.4 | 318 | 101 | 22.6 | — | — | .125 | 2.7 |
| 18 | 40% EP Copolym | 0 | 0 | −0.1 | +0.3 | −1.7 | 0 | −3.0 | −5.2 | 218 | 228 | 16.2 | .4 | .775 | 1.225 | 2.4 |
| | | 20 | 17.3 | −8.6 | +1.5 | −13.6 | +1.7 | −16.2 | −2.5 | 222 | 183 | 18.8 | .05 | .325 | .663 | 2.6 |
| | | 25 | 18.2 | −7.7 | +1.8 | −15.2 | −1.7 | −18.3 | −1.9 | 228 | 168 | 19.3 | — | .238 | .525 | 2.5 |
| | | 30 | 21.2 | −13.0 | +2.0 | −17.9 | +1.9 | −21.2 | −2.0 | 232 | 156 | 19.9 | — | .162 | .4 | 2.7 |
| | | 35 | 25.2 | −13.1 | +2.4 | −19.0 | +2.2 | −24.0 | −1.2 | 239 | 155 | 21.2 | — | .138 | .4 | 2.2 |
| 19 | 20% EP Copolym | 0 | 0 | −1.5 | −0.3 | −2.3 | −1.8 | −3.9 | −7.5 | 182 | 19.1 | 19.1 | .375 | .563 | 1.038 | 2.2 |
| | | 20 | 11.1 | −9.9 | +2.0 | −13.0 | +1.3 | −16.3 | −3.0 | 224 | 141 | 21.1 | — | .238 | .463 | 2.1 |
| | | 25 | 15.5 | −12.0 | +2.5 | −15.2 | +2.2 | −18.9 | −2.9 | 270 | 136 | 21.8 | — | .088 | .338 | 2 |
| | | 30 | 19.2 | −13.0 | +2.5 | −17.0 | +2.5 | −20.9 | −1.4 | 277 | 127 | 22.4 | — | .038 | .25 | 2.1 |
| 20 | 100% Homopol. | 0 | 0 | −0.7 | 0 | −1.0 | −0.7 | −2.2 | −2.9 | 293 | 223 | 20.2 | .250 | .425 | .613 | 3 |
| | | 20 | 12.1 | −2.7 | +1.9 | −11.5 | +2.3 | −14.3 | +0.3 | 299 | 157 | 21.5 | — | .1 | .275 | 3.1 |
| | | 25 | 16.4 | −8.7 | +2.5 | −13.8 | +2.5 | −16.7 | +0.7 | 298 | 150 | 21.1 | — | .025 | .188 | 2.7 |

TABLE 3-continued

| Example | Core Comp. | MDO2 Computer | MDO2 Tach | Dim. Stab. 99° C. (210° F.) MD | Dim. Stab. 99° C. (210° F.) TD | Dim. Stab. 116° C. (240° F.) MD | Dim. Stab. 116° C. (240° F.) TD | Dim. Stab. 135° C. (275° F.) MD | Dim. Stab. 135° C. (275° F.) TD | MD Mod- ulus (KSI) | TENSILE Elongation (%) | Ulti- mate (KSI) | MD Elongation 60° C. (140° F.) .25 pli | MD Elongation 60° C. (140° F.) .50 pli | MD Elongation 60° C. (140° F.) .75 pli | Haze (%) |
|---|---|---|---|---|---|---|---|---|---|---|---|---|---|---|---|---|
| | | 30 | 19.2 | −12.5 | +3.0 | −15.5 | +3.3 | −18.9 | +2.0 | 311 | 141 | 22.6 | — | .038 | .225 | 2.5 |
| 21 | 8% Syndio. PP | 35 | 18 | −12.5 | +3.4 | −15.5 | +4.3 | −20.4 | +3.3 | 273 | 124 | 18.8 | — | .075 | | 4.2 |
| 22 | 8% Syndio PP + 20% EP | 35 | 21 | −15.5 | +4.2 | −21.0 | +4.2 | −25.3 | +0.3 | 249 | 95 | 19.7 | — | .063 | .275 | 3.4 |
| 23 | 6% Syndio. PP + 20% EP | 35 | 24 | −15.8 | +3.0 | −21.7 | +3.7 | −25.5 | −0.4 | 251 | 105 | 20.4 | — | .038 | .3 | 3.1 |
| 24 | 6% Syndio. PP + 10% EP | 30 | 19 | −14.4 | +3.2 | −19.2 | +3.7 | −23.2 | +0.5 | 271 | 110 | 21.3 | — | — | .275 | 3.7 |
| 25 | 2.25% Added Atacticity | 0 | — | | | | | −6.7 | −2.5 | 224 | 269 | 15.2 | | | .163 | 1.9 |
| | reference | 30 | — | −10.3 | +2.7 | −13.7 | +2.4 | −18.5 | +0.5 | 274 | 133 | 21.2 | | | | 2 |

TABLE 4

| Example | Core Comp. | MDO2 Computer | MDO2 Tach | Dim. Stab. 99° C. (210° F.) MD | Dim. Stab. 99° C. (210° F.) TD | Dim. Stab. 116° C. (240° F.) MD | Dim. Stab. 116° C. (240° F.) TD | Dim. Stab. 135° C. (275° F.) MD | Dim. Stab. 135° C. (275° F.) TD | MD Mod- ulus (KSI) | TENSILE Elongation (%) | Ulti- mate (KSI) | MD Elongation 60° C. (140° F.) .25 pli | MD Elongation 60° C. (140° F.) .50 pli | MD Elongation 60° C. (140° F.) .75 pli | Haze (%) |
|---|---|---|---|---|---|---|---|---|---|---|---|---|---|---|---|---|
| 26 | 5% LLDPE (EXXON 2009) | 0 | 2.7 | −1.0 | 0 | −1.7 | −1.0 | −2.5 | −5.3 | 268 | 198 | 20.5 | .29 | .535 | .736 | 5.1 |
| | | 20 | 12.3 | −8.3 | +2.0 | −12.1 | +1.9 | −15.3 | −1.5 | 273 | 160 | 23.2 | 0 | .235 | .413 | 5.8 |
| | | 25 | 14.8 | −10.5 | +2.4 | −14.3 | +2.0 | −17.9 | −1.2 | 281 | 140 | 23.1 | 0 | .14 | .34 | 5.4 |
| | | 30 | 18.5 | −12.0 | +3.0 | −16.3 | +2.7 | −20.4 | −0.4 | 293 | 132 | 23.8 | 0 | .09 | .25 | 5.3 |
| | | 35 | 20.4 | −13.9 | +2.7 | −18.0 | +3.2 | −22.5 | +0.7 | 300 | 118 | 23.8 | 0 | .045 | .223 | 5.0 |
| | | 40 | 25.6 | −14.6 | +3.3 | −19.9 | +3.3 | −24.3 | +0.7 | 298 | 117 | 25.0 | 0 | .05 | .248 | 4.9 |
| 27 | 10% LLDPE (EXXON 2009) | 0 | 0 | −0.7 | 0 | −1.3 | −1.3 | −2.7 | −6.7 | 231 | 182 | 19.7 | .33 | .60 | .875 | 10.0 |
| | | 25 | 15.5 | −10.2 | +2 | −14.2 | +2 | −17.9 | −1.9 | 247 | 133 | 22.6 | 0 | .215 | .44 | 11.0 |
| | | 35 | 22.2 | −13.0 | +2.9 | −18.5 | +3.3 | −21.9 | −0.5 | 272 | 112 | 23.7 | 0 | .08 | .3 | 9.5 |
| | | 40 | 25.4 | −13.7 | +2.9 | −20.0 | +3.3 | −23.9 | 0 | 279 | 103 | 24.6 | 0 | .055 | .25 | 9.3 |
| 28 | 5% LLDPE (EXXON 3016) | 0 | 0 | −1.1 | 0 | −1.7 | −1.7 | −3.3 | −6.7 | 262 | 197 | 21.3 | .25 | .445 | .71 | 4.3 |
| | | 25 | 14.8 | −11.2 | +2.7 | −14.9 | +2.6 | −18.7 | −0.9 | 283 | 130 | 22.7 | 0 | .135 | .355 | 4.7 |
| | | 40 | 29.5 | −14.7 | +3.0 | −19.2 | +4.0 | −23.9 | +0.9 | 300 | 112 | 25.0 | 0 | 0 | .155 | 4.5 |
| 29 | 10% LLDPE (EXXON 3016) | 0 | 0 | −1 | +0 | −1.5 | −1.7 | −3.0 | −7.2 | 220 | 177 | 19.8 | .245 | .725 | .88 | 9.4 |
| | | 25 | 13.5 | −11.0 | +2.4 | −14.3 | +2.0 | −18.0 | −1.3 | 24.5 | 120 | 22.4 | 0 | .195 | .445 | 9.4 |
| | | 40 | 22.4 | −15.3 | +3.8 | −20.0 | +4.0 | −23.7 | +0.3 | 270 | 105 | 24.6 | 0 | .05 | .25 | 9.5 |
| 30 | 10% Chisso 7880 | 0 | 0 | −1.1 | +0 | −2.0 | −1.5 | −3.7 | −6.5 | 255 | 200 | 19.7 | .255 | .59 | .84 | 4.7 |
| | | 25 | 15.8 | −9 | +2.2 | −12.3 | +1.9 | −15.7 | −2.3 | 256 | 153 | 22.3 | 0 | .23 | .475 | 4.5 |
| 31 | 20% Chisso 7880 | 0 | 1.3 | −1.1 | +0.1 | −1.7 | −1.0 | −3.0 | −5.6 | 224 | 211 | 18.2 | .29 | .54 | .925 | 6.0 |
| | | 20 | 13.6 | −8.5 | +2.0 | −12.2 | +1.7 | −16.0 | −2.0 | 228 | 173 | 20.5 | .095 | .395 | .59 | 6.0 |
| | | 25 | 14.7 | −9.5 | +2.1 | −13.9 | +2.2 | −18.5 | −1.3 | 236 | 159 | 21.0 | 0 | .575 | .25 | 6.0 |
| | | 30 | 18.6 | −12 | +2.3 | −16.5 | +2.4 | −21.0 | −0.1 | 241 | 149 | 21.4 | 0 | .2 | .475 | 5.8 |
| | | 40 | 22.3 | −14.7 | +2.7 | −20.0 | +3.0 | −25.7 | +0.5 | 250 | 132 | 22.3 | 0 | .051 | .275 | 6.1 |
| 32 | 4% EOD 9502 | 0 | 1 | −1.1 | +.3 | −1.7 | −1.0 | −3.3 | −5.0 | 257 | 205 | 18.7 | .245 | .445 | .675 | 2.8 |
| | | 35 | 23 | −13.7 | +2.7 | −18.3 | +2.7 | −22.3 | +.7 | 291 | 133 | 23.9 | 0 | 0 | .225 | |
| 33 | 4% EOD 9502 + 10% EP | 0 | 1 | −1.0 | 0 | −1.3 | −1.1 | −2.7 | −5.0 | 246 | 219 | 18.6 | .245 | .470 | .755 | 2.3 |
| | | 35 | 20 | −13.0 | +2.5 | −18.5 | +2.5 | −22.5 | +.8 | 275 | 133 | 21.5 | .0 | .1 | .338 | 2.6 |
| 34 | 4% EOD 9502 + 5% EP | 35 | 21 | −14.3 | +3.5 | −18.7 | +3.9 | −23.2 | +1.2 | 299 | 120 | 21.8 | 0 | 0 | .205 | 2.6 |
| 35 | 6% EOD 9502 | 0 | 1 | −1.0 | +0 | −1.7 | −1.1 | −2.7 | −4.8 | 253 | 225 | 19.2 | .24 | .5 | .755 | 3.2 |
| | | 35 | 22 | −14.0 | +2.6 | −18.5 | +2.9 | −22.8 | +.3 | 291 | 125 | 22.4 | 0 | .035 | .25 | 3.2 |
| 36 | 6% EOD 9502 + 5% EP | 35 | 21 | −13.7 | +3.0 | −18.0 | +3.5 | −23.0 | +.7 | 279 | 120 | 21.6 | 0 | .075 | .273 | 3.2 |
| 37 | 6% EOD 9502 + 10% EP | 35 | 22 | −13.5 | +2.9 | −18.0 | +3.0 | −22.5 | +.3 | 266 | 124 | 21.0 | 0 | .07 | .3 | 3.1 |

It is claimed:

1. A uniaxially heat-shrinkable, biaxially oriented, multilayer film having a polypropylene-containing core layer and at least one polyolefin-containing skin layer adjacent said core layer, said core layer containing isotactic polypropylene and a modifier which reduces the crystallinity of the polypropylene by increasing chain imperfections of the polypropylene-containing core layer or reducing isotacticity of the polypropylene-containing core.

2. The multilayer film of claim 1 wherein said modifier is a polyolefin other than isotactic polypropylene.

3. The multilayer film of claim 2 wherein said modifier is selected from the group consisting of atactic polypropylene, syndiotactic polypropylene, ethylene-propylene copolymer, propylene-butylene copolymer, ethylene-propylene-butylene terpolymer, polybutylene, and linear low density polyethylene.

4. The multilayer film of claim 3 wherein said modifier is selected from the group consisting of syndiotactic polypropylene and ethylene-propylene copolymer.

5. The multilayer film of claim 4 wherein said polypropylene-containing core layer contains as said modifier 4 to 8 wt % syndiotactic polypropylene and 0 to 20 wt %. ethylene-propylene copolymer.

6. The multilayer film of claim 5 wherein said polypropylene-containing core layer contains as said modifier 4 to 8 wt % syndiotactic polypropylene and 0 wt % ethylene-propylene copolymer.

7. The multilayer film of claim 6 wherein said polypropylene-containing core layer contains as said modifier 4 to 6 wt % syndiotactic polypropylene and 0 wt % ethylene-propylene copolymer.

8. The multilayer film of claim 3 wherein said polypropylene-containing core layer contains 10 to 30 wt % atactic polypropylene as said modifier.

9. The multilayer film of claim 3 wherein said polypropylene-containing core layer contains 15 to 30 wt % atactic polypropylene having an atacticity of 15 to 20%, as said modifier.

10. The multilayer film of claim 3 wherein said modifier comprises propylene-butylene copolymer.

11. The multilayer film of claim 10 wherein said core layer comprises 5 to 20 wt % of said propylene-butylene copolymer as modifier.

12. The multilayer film of claim 3 wherein said modifier comprises linear low density polyethylene.

13. The multilayer film of claim 12 wherein said core layer comprises 5 to 10 wt % of said linear low density polyethylene having a density of 0.89 to 0.92 g/cc as modifier.

14. The multilayer film of claim 3 wherein said modifier comprises ethylene-propylene-butylene terpolymer.

15. The multilayer film of claim 14 wherein said core layer comprises 5 to 20 wt % of said terpolymer, said terpolymer comprising 3 to 5 wt % ethylene, and 3 to 6 wt % butylene.

16. The multilayer film of claim 14 wherein said core layer comprises 5 to 20 wt % of said terpolymer, said terpolymer comprising 0.5 to 2.5 wt % ethylene, and 3 to 20 wt % butylene.

17. The multilayer film of claim 1 wherein said film is capable of greater than 15% shrinkage at 100° to 145° C. in a first direction with ±5% stability in a second direction substantially normal to said first direction.

18. The multilayer film of claim 17 wherein said core layer comprises polypropylene having a MFI of 2 to 4, and said film is capable of greater than 25% shrinkage at 135° C. in a first direction with ±3% stability in a second direction substantially perpendicular to said first direction.

19. The multilayer film of claim 1 wherein said core layer comprises 2 to 15 wt % polybutylene.

20. The multilayer film of claim 1 wherein said core layer comprises a plurality of voids formed by cavitation about a solid cavitating agent.

21. The multilayer film of claim 1 wherein said core layer contains 4 to 8 wt % polybutylene terephthalate (PBT) dispersed as particles of 0.2 to 2.0 microns diameter.

22. The multilayer film of claim 1 wherein said core layer comprises a polypropylene supporting layer containing 4 to 15 wt % $TiO_2$.

23. The multilayer film of claim 1 wherein said core layer comprises 2 to 10 wt % ethylene-propylene copolymer.

24. The multilayer film of claim 1 wherein said polypropylene-containing core layer comprises an ethylene-propylene copolymer containing 0.5 to 1.0 wt % ethylene.

25. The multilayer film of claim 1 wherein said polypropylene-containing core layer has an overall atacticity of at least 4%.

26. The multilayer film of claim 25 wherein said polypropylene comprises a mixture of 70 to 90 wt % isotactic polypropylene and 10 to 30 wt % of polypropylene having atacticity ranging from 15 to 20%.

27. The multilayer film of claim 1 wherein said core layer comprises up to 25 wt % recycled polypropylene (RPP).

28. The multilayer film of claim 1 which is primarily oriented by biaxially orienting 3 to 6 times in the machine direction, and 5 to 10 times in the transverse direction, and secondarily oriented by reorienting an additional 10 to 40% in the machine direction.

29. The multilayer film of claim 28 wherein said film is primarily oriented by synchronously accelerating directly opposed pairs of tenter clips holding said film, along a diverging path.

30. The multilayer film of claim 29 wherein said film is secondarily oriented by synchronously accelerating said directly opposed pairs of tenter clips holding said film along a straight path.

31. The multilayer film of claim 1 wherein said skin layer is selected from at least one of the group consisting of polypropylene, ethylene-propylene copolymer, polyethylene, propylene-butylene copolymer, and ethylene-propylene-butylene terpolymer, said skin layer having a thickness of 0.5 to 1.0 micron.

32. The multilayer film of claim 31 wherein said skin layer contains a non-meltable silicone resin.

33. The multilayer film of claim 1 which is treated on at least one side by flame or corona discharge.

34. A uniaxially heat shrinkable, multilayer, biaxially oriented film comprising a) a heat shrinkable polypropylene-containing core layer having a DSC melting point of less than 160° C., and b) at least one heat shrinkable polyolefin-containing skin layer, said film being capable of greater than 20% shrinkage at 135° C. in a first direction with ±1% stability in a second direction substantially normal to said first direction.

* * * * *